United States Patent [19]
Yamamoto et al.

[11] Patent Number: 5,245,544
[45] Date of Patent: Sep. 14, 1993

[54] METHOD FOR DETERMINING INNER DIAMETER MACHINING METHOD IN NUMERICAL CONTROL INFORMATION GENERATING FUNCTION

[75] Inventors: Kyoichi Yamamoto; Yasushi Fukaya; Kenji Ito, all of Niwa, Japan

[73] Assignee: Kabushiki Kaisha Okuma Tekkosho, Aichi, Japan

[21] Appl. No.: 616,656

[22] Filed: Nov. 21, 1990

[30] Foreign Application Priority Data

Nov. 24, 1989 [JP] Japan .................................. 1-305628

[51] Int. Cl.$^5$ ............................................ G06F 15/46
[52] U.S. Cl. ............................ 364/474.22; 364/474.25
[58] Field of Search ................. 364/474.22, 474.24, 364/474.25, 474.32, 474.33, 474.34, 474.21, 474, 23, 474.31, 474.26, 474.27

[56] References Cited

U.S. PATENT DOCUMENTS

| | | | |
|---|---|---|---|
| 4,033,206 | 7/1977 | Morita et al. | 364/474.22 |
| 4,074,349 | 2/1978 | Ueda | 364/474.22 |
| 4,490,781 | 12/1984 | Kishi et al. | 364/474.25 |
| 4,550,378 | 10/1985 | Nozawa et al. | 364/474.21 |
| 4,723,203 | 2/1988 | Kishi et al. | 364/474.22 |
| 4,788,636 | 11/1988 | Shiratori et al. | 364/474.23 |
| 4,821,201 | 4/1989 | Kawamura et al. | 364/474.31 |
| 4,928,221 | 5/1990 | Belkhiter | 364/474.25 |
| 5,099,432 | 3/1992 | Fukaya et al. | 364/474.25 |

*Primary Examiner*—Jerry Smith
*Assistant Examiner*—Jim Trammell
*Attorney, Agent, or Firm*—Wenderoth, Lind & Ponack

[57] ABSTRACT

For the function of forming numerical control information prior to machining process, the type of machining (such as drilling, end milling, outer diameter end face, etc.) and machining scope for each machining area is determined by inputting the shapes of a work and a part determining the machining areas based on said shapes, identifying the areas for inner diameter machining out of said machining areas, extracting from said inner diameter machining areas those characteristic areas to the inner diameter machining such as the area where a rear end face exists on the part shape, where a through hole is unprocessed or where a through hole is bored on the work based on the shape elements. As this method does not require preliminary reviewing of the machining method for inner diameter (and especially for small diameter), it allows beginner operators to produce numerical control information as easily as a skilled operator.

44 Claims, 38 Drawing Sheets

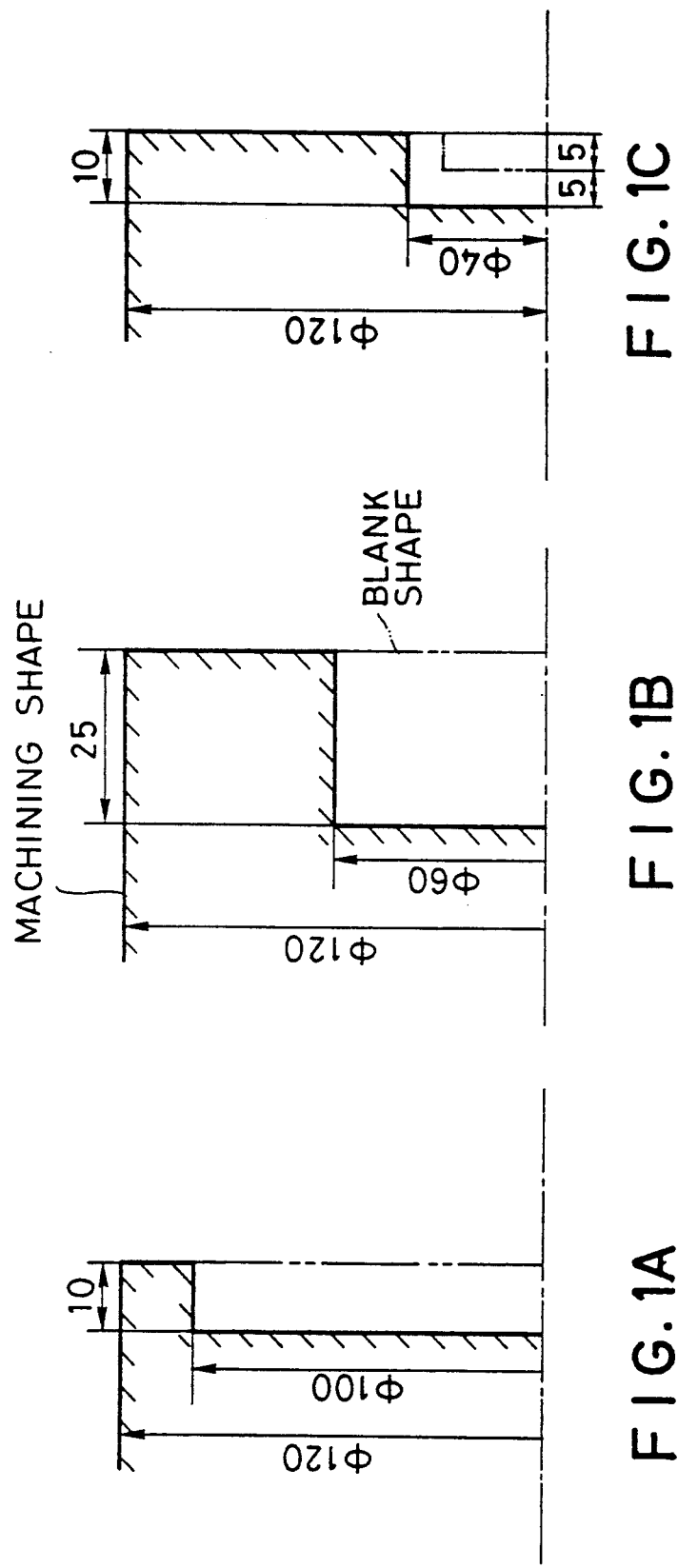

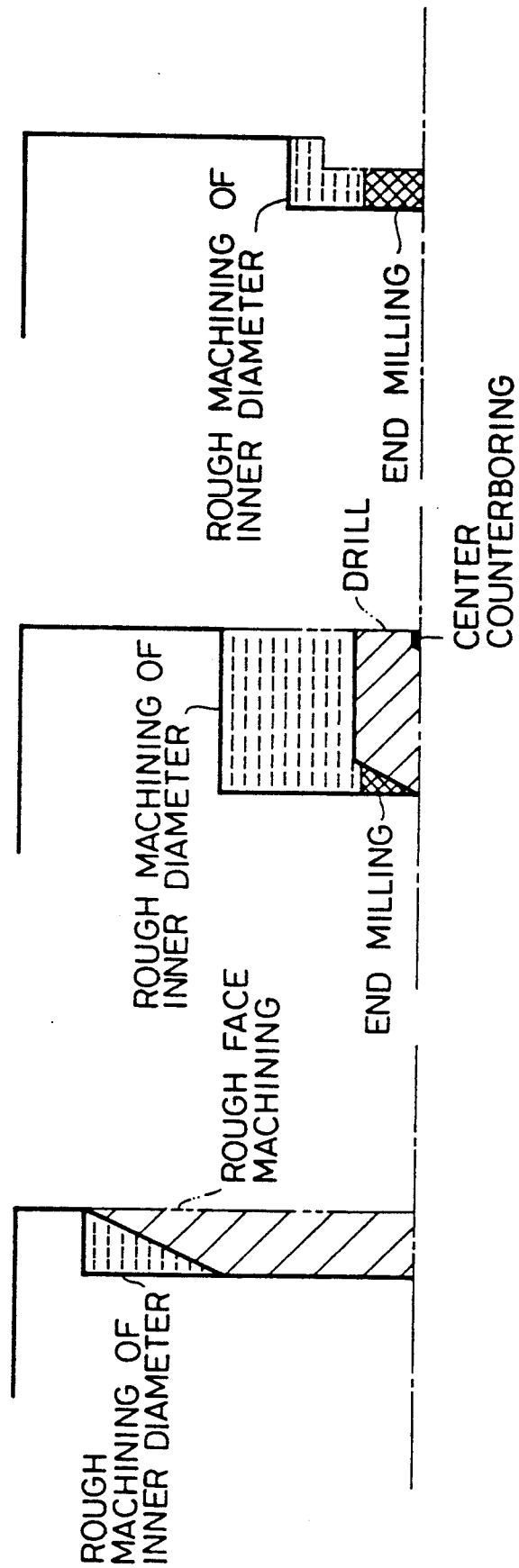

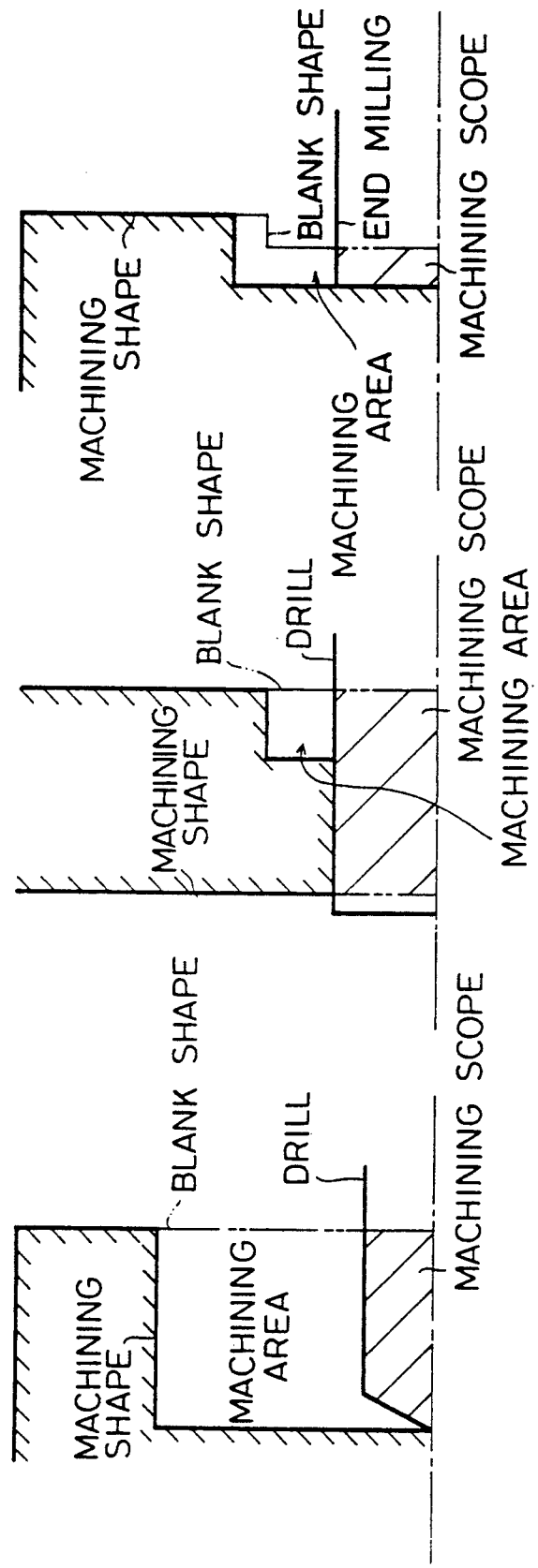

| FIG.12A-1 |
|---|
| FIG.12A-2 |

FORM ROUGH MACHINING PROCESS FOR INNER DIAMETER

S301: DOES INNER DIAMETER MACHINING AREA EXIST?
- NO → RTS
- YES ↓

S302: IS THERE BORED THROUGH HOLE ON MACHINING SHAPE?
- NO ↓
- YES ↓

S303: IS THERE BORED THROUGH HOLE ON BLANK SHAPE?
- NO →  (1)
- YES ↓

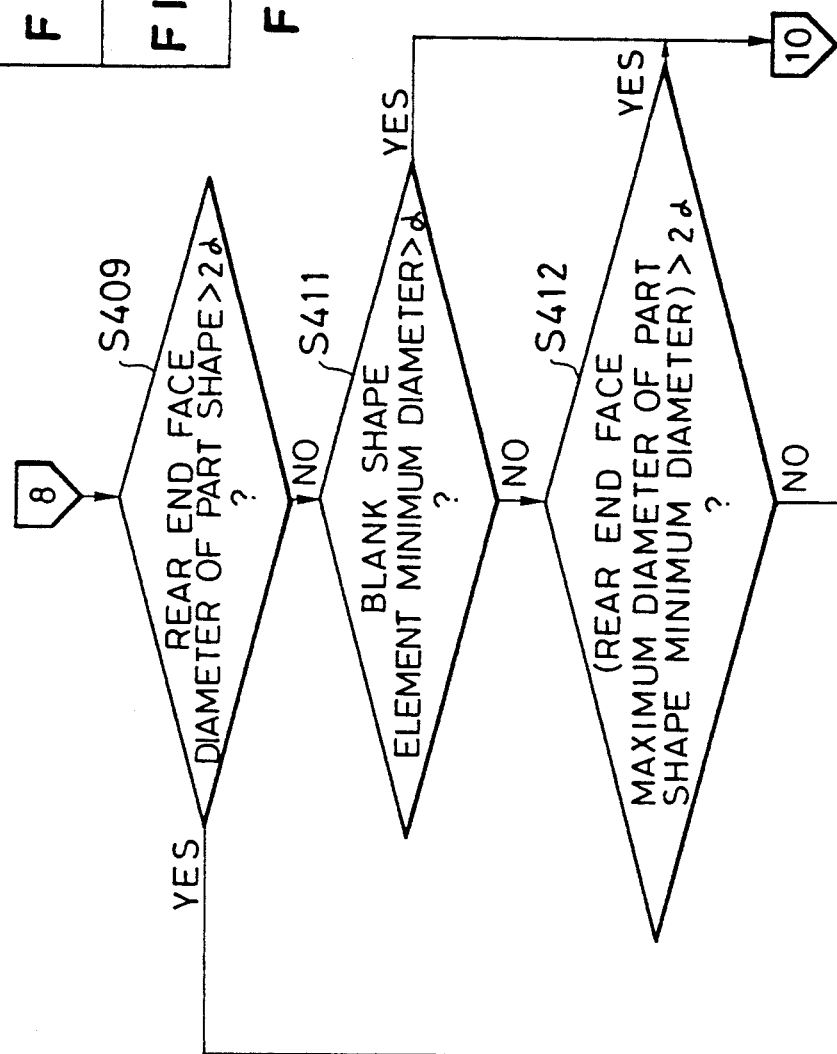

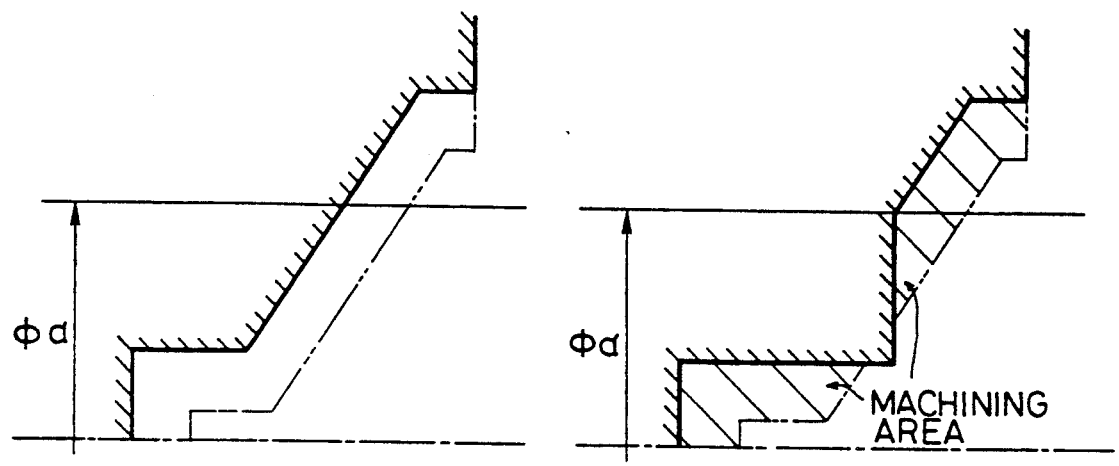
F I G. 16A  F I G. 16B
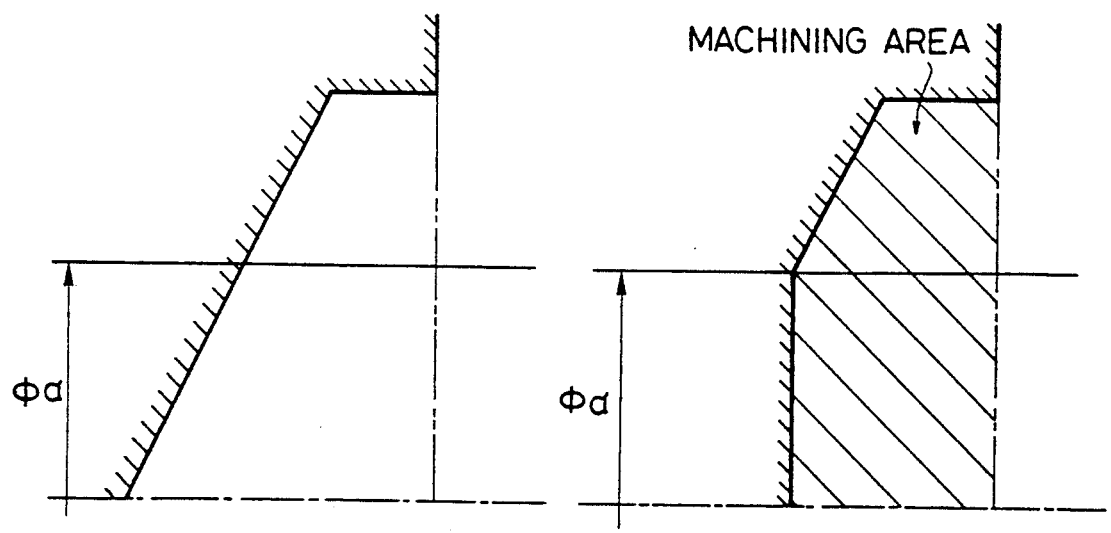
F I G. 17A  F I G. 17B

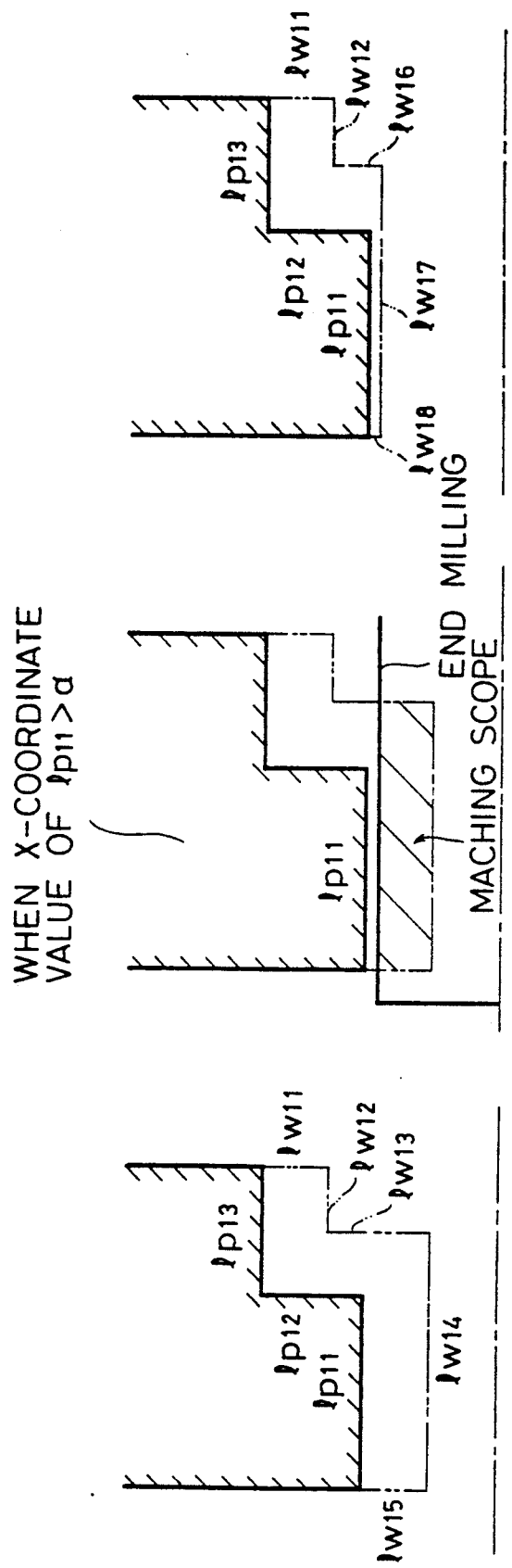

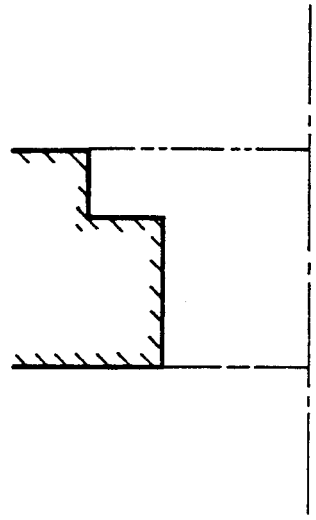
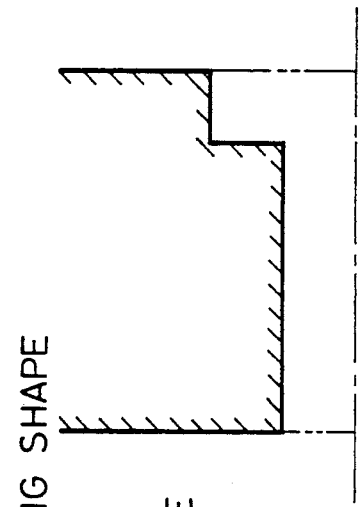
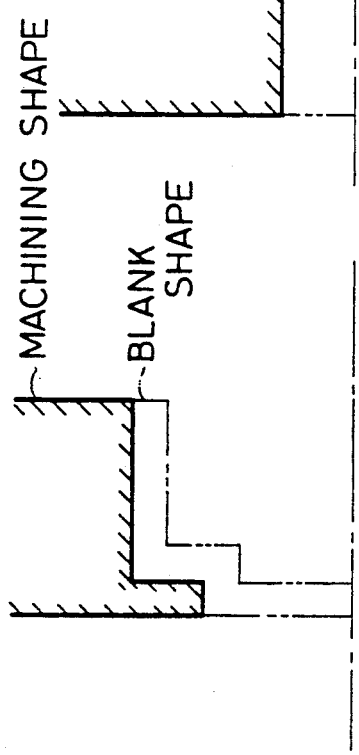
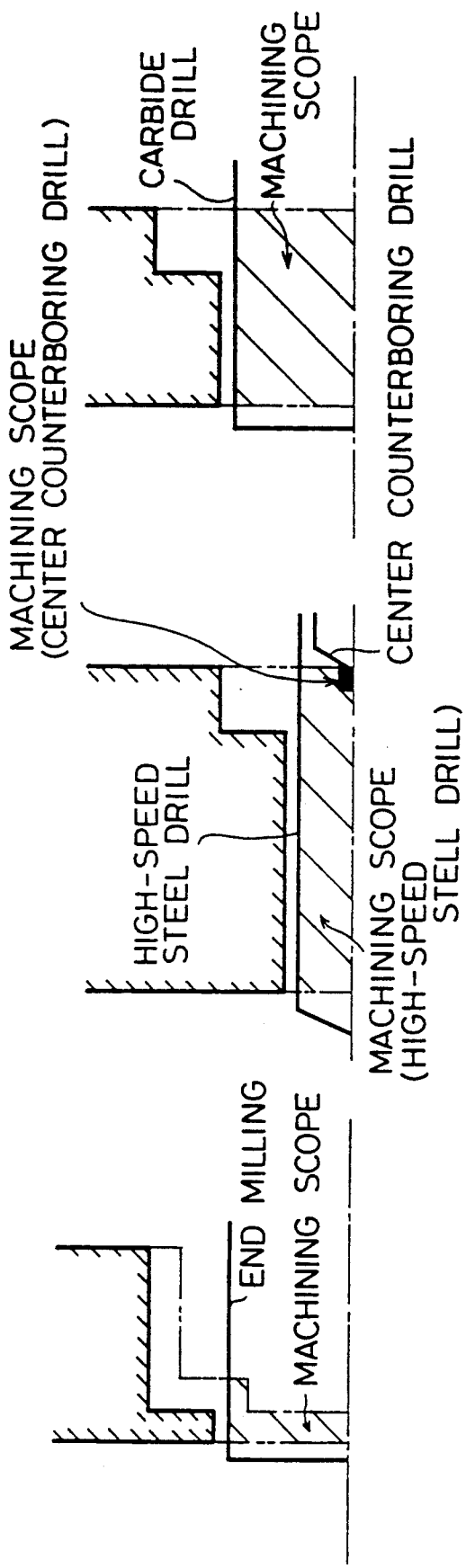

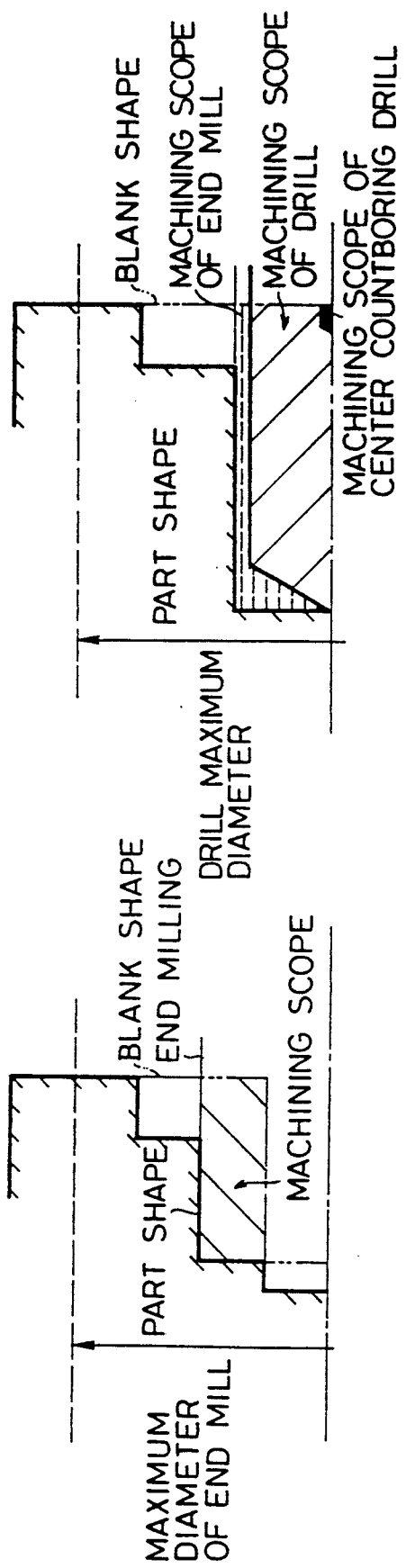

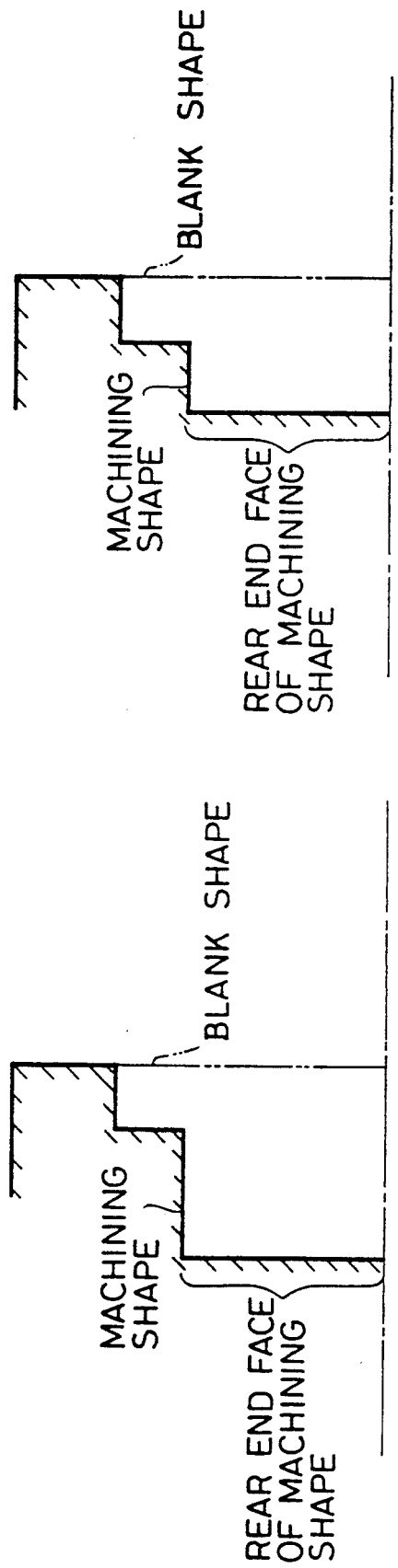
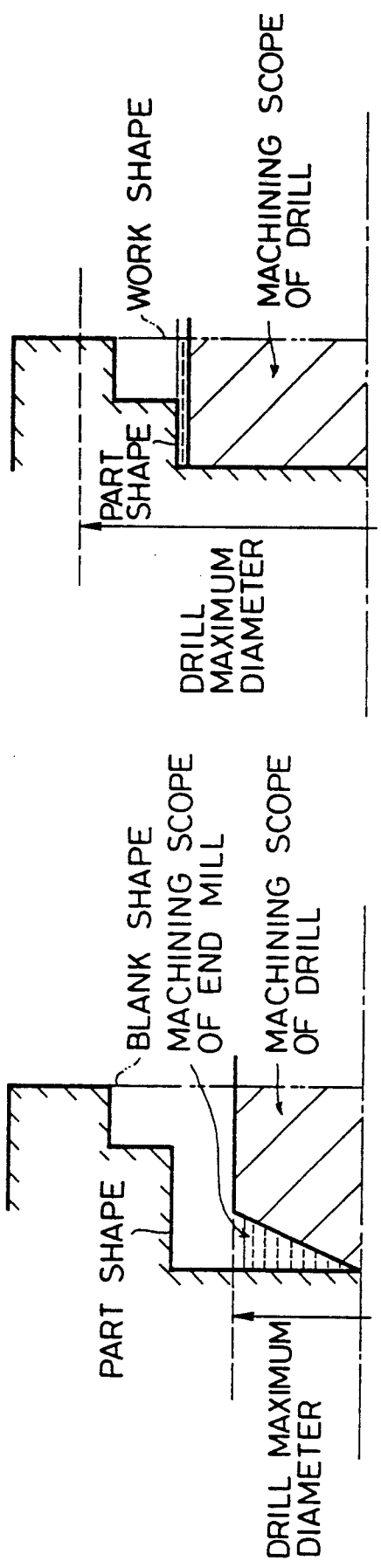

METHOD FOR DETERMINING INNER DIAMETER MACHINING METHOD IN NUMERICAL CONTROL INFORMATION GENERATING FUNCTION

BACKGROUND OF THE INVENTION

The present invention relates to a method for determining a machining method in the numerical control information generating function which forms information for numerical control prior to machining, and more particularly to a method for determining the type and scope, i.e.-inherent limitations, of the machining in each step in an inner diameter machining.

There has been realized a numerical control information generating function which, when necessary data are inputted using a graphic display screen of the interactive type, forms the numerical control information such as NC programs from design drawings. This function permits inputting of the shape to be machined simply by pressing suitable keys on the panel according to the shape of component part on the design drawings. In the numerical control information generating function as above described, information necessary for setting data is conveniently displayed in graphics, and various data such as dimensions may be inputted in response to questions asked in easy and everyday language which laymen can understand. Furthermore, as soon as all the data necessary for forming numerical control information are inputted, the shape of a blank or the shape of a machining is instantly displayed, automatic calculation of numerical control data is started, tool tracks are graphically displayed and the numerical control information is formed.

The function of the numerical control information generating function generally comprises the following steps 1 to 10:
1. Selecting a work material
2. Selecting a graphical type
3. Inputting the shape and dimension of a work
4. Inputting the shape and dimension to be machined
5. Inputting the original point of the machine and the turret position
6. Selecting the types of machining
7. Selecting tools
8. Determining the scope, i.e.-inherent limitations, of each type of the machining
9. Inputting the cutting conditions
10. Calculating the tool paths Necessary data are sequentially inputted to eventually form the numerical control information.

In the conventional function described as above, after the steps of inputting the blank shape and the machining shape, an operator determines which area of the blank should be machined in each step and what tool should be moved in which direction, and determines the order of use of the tools, and inputs the necessary data according to the order thus decided. Although the conventional method is flexible as the operator can freely select the order and scope of use of the tools, the operator requires certain skills and experience with regard to machining and therefore, a beginner operator sometimes finds the step of setting various data difficult and cumbersome.

The conventional method requires a great deal of time in inputting the data since it requires selecting the types of machining, determining their order, and inputting each type of tool, cutting direction, machining scope, i.e.-inherent limitations, and cutting conditions for each type of machining. In order to overcome such short comings, Japanese Laid-Open Patent Application No. 126710/1985 teaches a method which stores in advance the order of the machining steps, evaluates for each step which machining types are necessary in the above order, and automatically determines, if necessary, the scope and cutting direction for each given machining operation. However, it teaches only one way of determining which types of machining and their scope are necessary. Particularly, in the case of inner diameter machining, where various machining steps are needed depending on the shapes and size of each of type of machining and the blanks, it becomes impossible to select an optimal type and scope of machining. For example, when the machinings are to be roughly machined from the blanks as shown in FIGS. 1A, 1B and 1C, the types of the machining to be selected by the conventional method are determined indiscriminately:

center counterboring
drilling
rough machining of inner diameter and the machining scopes are determined as shown in FIGS. 2A, 2B and 2C.

However, when an operator actually designates the types and scope of the machining, the types of the machining for the case FIG. 2A will be:

end face rough machining
rough machining of inner diameter and the scope of the machining becomes set as shown in FIG. 3A. In the case of FIG. 3B, the types of the machining are generally set:

center counterboring
drilling
end milling
rough machining of inner diameter while the machining scope is set as shown in FIG. 3B. Moreover, in the case of FIG. 3C, the types of the machining are:

end milling
rough machining of inner diameter and the scope is set as shown in FIG. 3C.

As illustrated as above, the conventional method could not quite correspond optimally to the various needs in the machining steps as the types and scope of the machining are determined without considering the shape and dimension of the machinings and the blanks.

Although the conventional automatic programming systems automatically determine the type and scope of the machining for machining a part simply by inputting the shapes of the machining and the blank, none of them can determine the types of machining after evaluating the shapes and size of the areas to be machined that are defined by the shape of the machining and the blank. They could only determine unilaterally the type and scope of the machining for inner diameter machining (especially small diameters) which requires various machining methods depending on the shapes and size of the machining area.

SUMMARY OF THE INVENTION

The present invention was contrived to solve such prior art problems as described above, and aims at providing a method for determining a machining method for inner diameter in the function of numerical control information generating which can determine the type and scope of machining for each step depending on the characteristics of the shape of each machining or blank without the necessity for the operator to review the machining method before data input, and which is so easy and simple in operation that beginners having no skills and experience on complicated inner diameter machining methods can easily handle the method.

According to one aspect of the present invention, for achieving the objects described above, there is provided a method for determining an inner diameter machining method in the numerical control information generating function which forms information for numerical control prior to machining, and which comprises the steps of: inputting a blank shape and a machining shape on which the machining is to be conducted; determining a machining area based on the inputted shapes; identifying areas for an inner diameter machining within said machining area, and extracting characteristic machining areas for various machining methods in the inner diameter machining within said inner diameter machining area based on machining element data thereof so as to automatically determine the types and scope of machining for said characteristic machining areas.

The nature, principle and utility of the invention will become more apparent from the following detailed description when read in conjunction with the accompanying drawings.

BRIEF DESCRIPTION OF THE DRAWINGS

In the accompanying drawings:

FIGS. 1A, 1B and 1C are diagrams showing examples of blank shapes and machining shapes to be machined on the inner diameter;

FIGS. 3A, 3B and 3C are diagrams showing the types and scope of the machining which should be determined for the parts shown in FIGS. 1A through 1C;

FIGS. 9A, 9B, and 9C show examples of the machining scope;

FIGS. 16A and 16B and FIGS. 17A and 17B show examples of the machining shape elements which are virtually determined;

FIGS. 18A 18B and 18C show examples of determining the machining scope and renewing the inner diameter machining area for rough machining with a boring tool;

FIGS. 19A, 19B, 20A, 20B, 21A, 21B show examples of determining the scope for machining a through hole by a boring tool;

FIGS. 24A, 24B, 25A, 25B, 26A, 26B, 27A, 27B, 28A, 28B, 29A, 29B show examples of determining the scope of machining at the rear end face of the machining shape by the boring tool;

DESCRIPTION OF THE PREFERRED EMBODIMENT

The present invention will now be described in more detail referring to preferred embodiments shown in attached drawings.

Figures 2A, 2B, 2C:
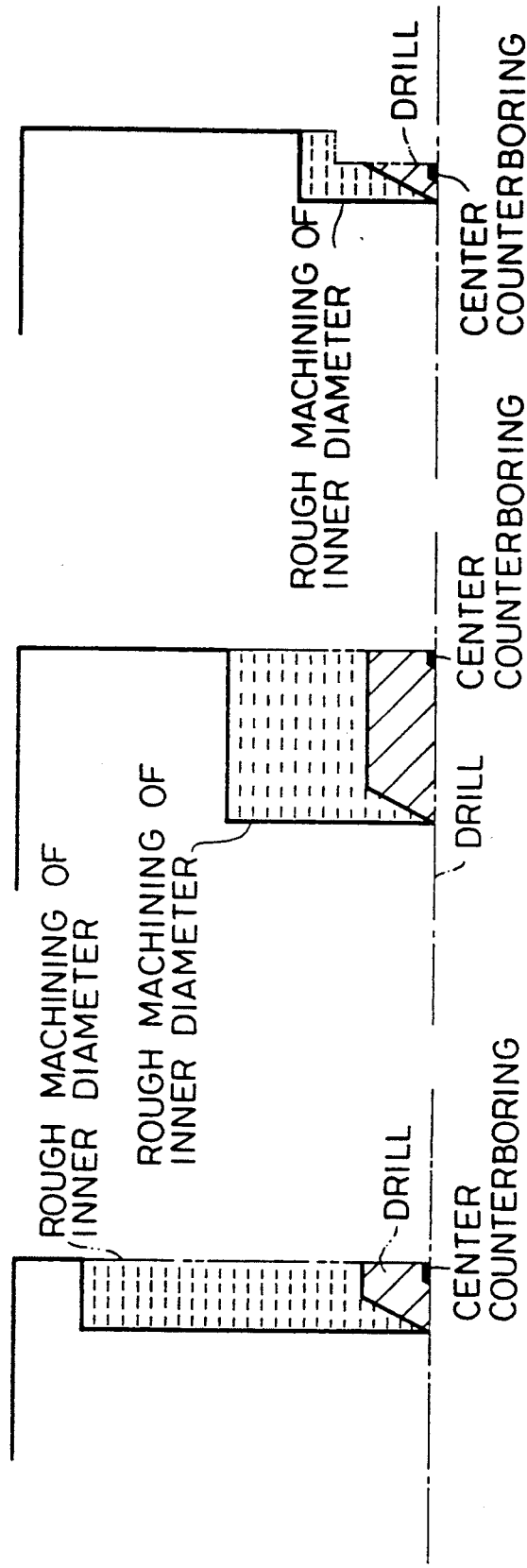
FIGS. 2A, 2B and 2C are diagrams showing the types and scope of the machining determined by the conventional method for the parts shown in FIGS. 1A through 1C.
Figure 4:
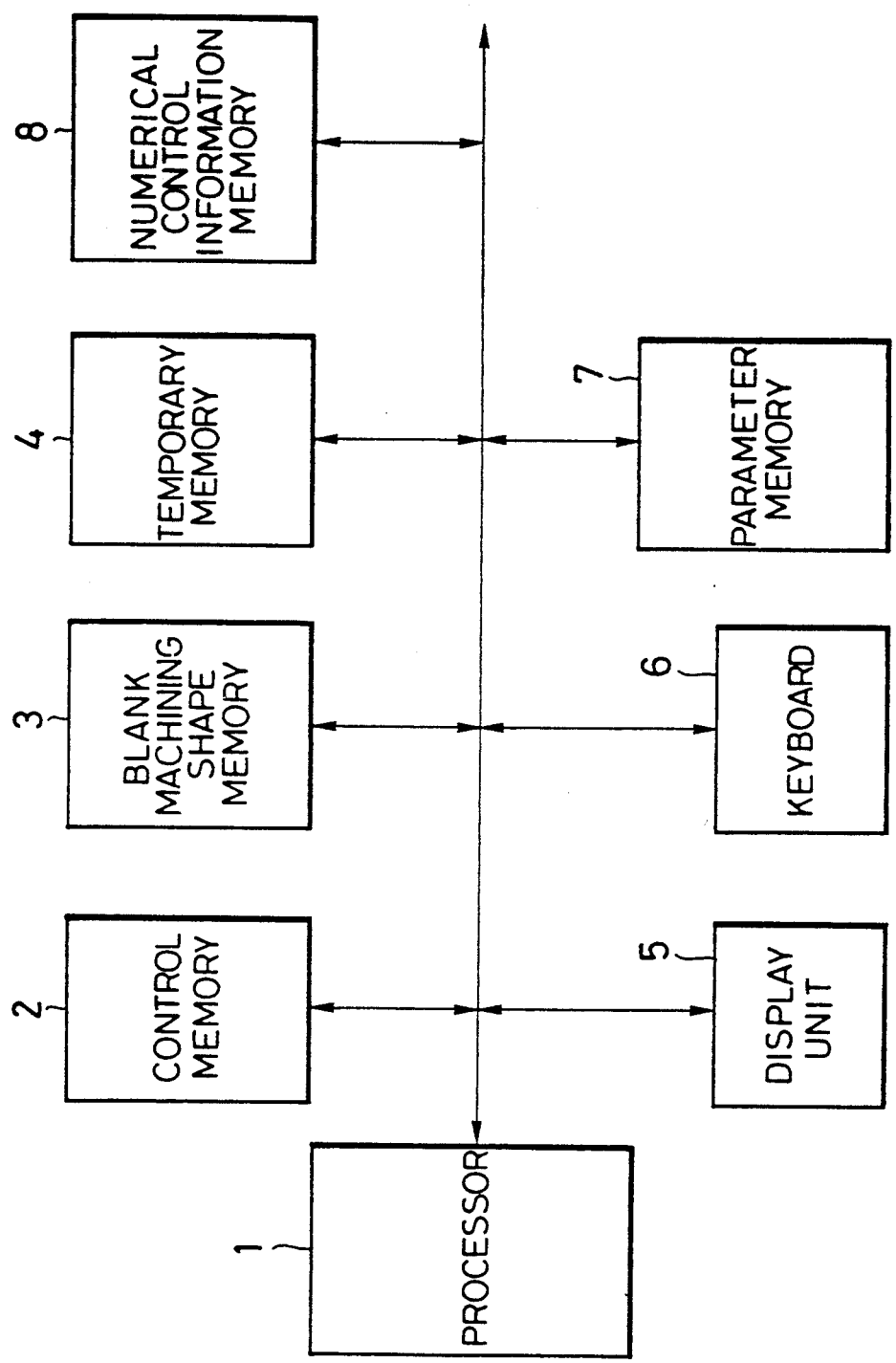
FIG. 4 is a block diagram showing an embodiment of the present invention.

FIG. 4 is a block diagram showing a system which realizes the method for determining an inner diameter machining method in the numerical control information function according to the present invention.

Figure 5:
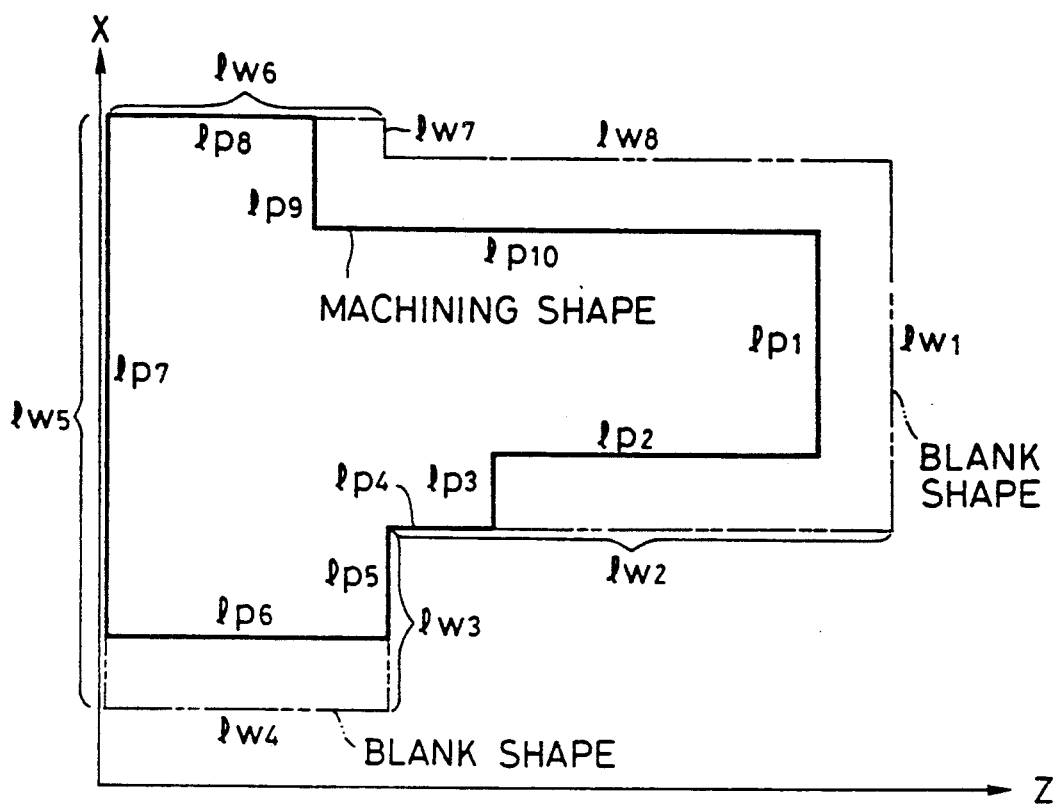
FIG. 5 is an example (n=1, 2, 3 . . . ) of the blank shape elements and the machining shape elements.

An operator inputs blank shapes and machining shapes from a keyboard 6 while confirming on the display unit 5 the entry of the inputs. The input blank shapes and machining shapes are developed into shape element strings and stored in a blank/machining shape memory 3. The shape element strings are described below. As shown in FIG. 5, the element shape comprises blank shape element strings $l_{w1}, l_{w2}, \ldots, l_{w8}$, while the machining shape comprises machining shape element strings $l_{p1}, l_{p2}, \ldots, l_{p10}$. Elements in the shape element strings comprise respective data on position, shape and size which are sufficient to specify a graphic figure.

Figure 6:
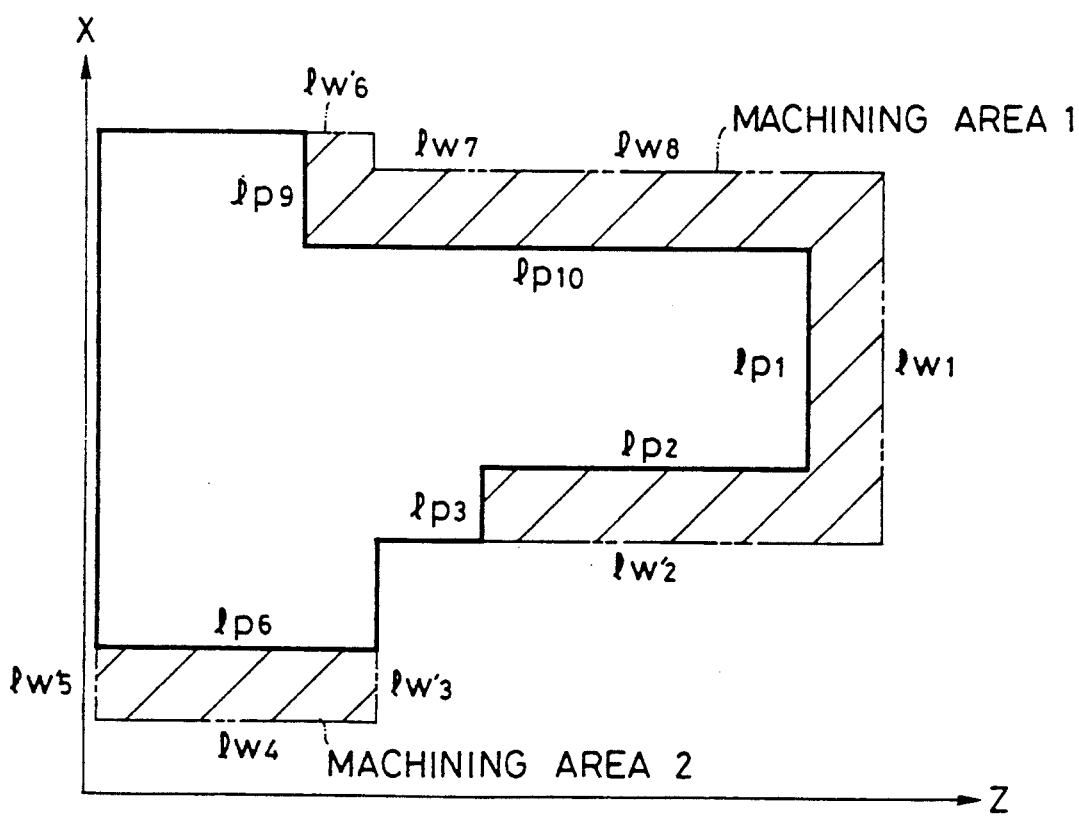
FIG. 6 is a diagram showing an example of machining area.

A processor 1 generates a shape element string which forms a machining area based on the blank shape element strings and the machining shape element strings and stores them in a temporary memory 4. The shape element strings which forms the machining area may be obtained from the machining shape/blank shape of FIG. 5 as shown in FIG. 6 below:

Machining area 1
    blank shape element string: $l_{w'6} \cdot l_{w7} \cdot l_{w8} \cdot l_{w1} \cdot l_{w'2}$
    machining shape element string: $l_{p3} \cdot l_{p2} \cdot l_{p1} \cdot l_{p10} \cdot l_{p9}$ Machining area 2
    blank shape element string: $l_{w'3} \cdot l_{w4} \cdot l_{w'5}$
    machining shape element string: $l_{p6}$.

The blank shape elements attached with the symbol "'" means that they are the elements obtained by subtracting from original blank shape the portions which overlap with machining shape elements.

Figure 7:
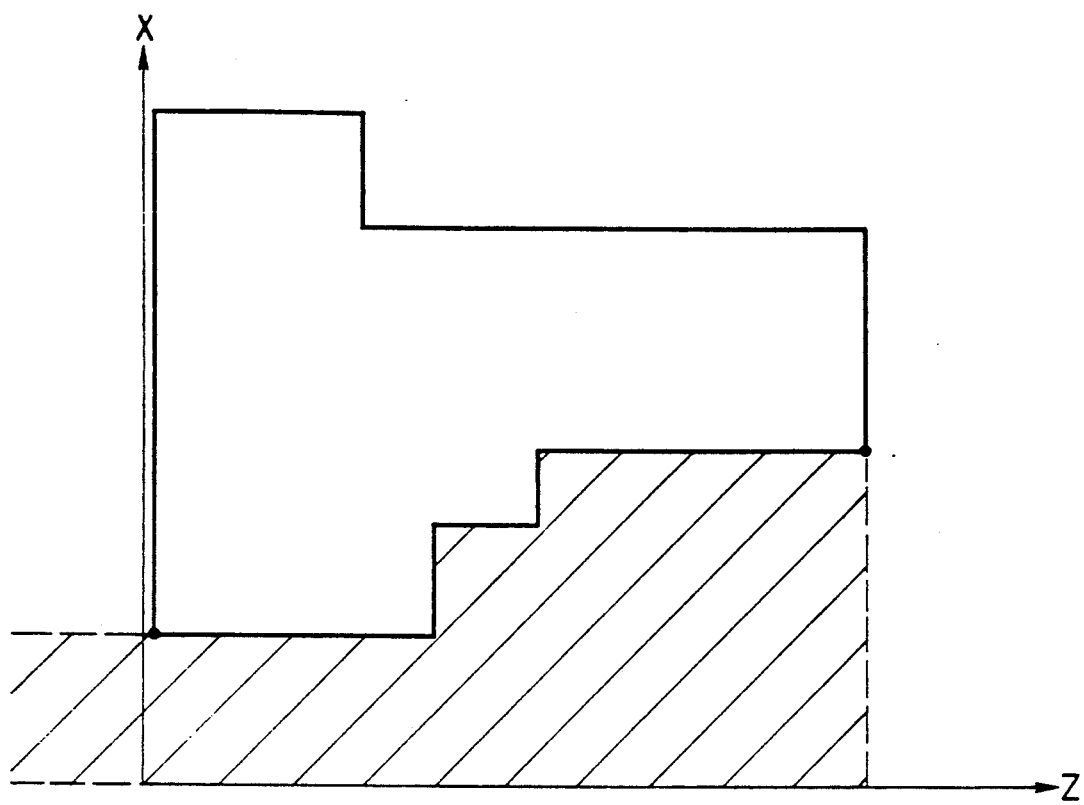
FIG. 7 shows an example of the scope of inner diameter machining.
Figure 8:
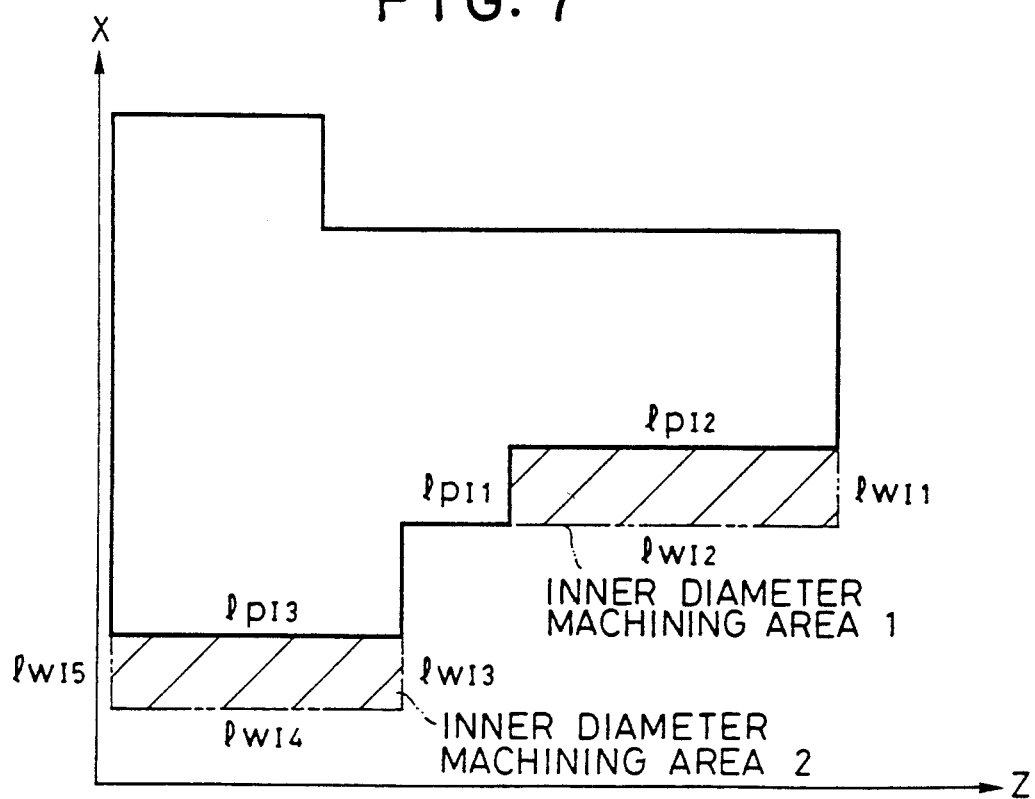
FIG. 8 shows an example of inner diameter machining area.

Then, the processor 1 forms a shape element string which forms an inner diameter machining area based on the inner diameter machining scope and the machining areas 1 and 2 and stores it in the temporary memory 4. The inner diameter machining scope is the scope which is determined on the premise that outer diameter and inner diameter machinings are to be conducted after an end face is machined, such as the portion shaded in FIG. 7. In other words, the inner diameter machining area which should be machined on the inner diameter is the machining area which exists within the inner diameter machining scope, such as those shaded in FIG. 8.

Inner diameter machining area 1
  blank shape element string: $l_{wf1} \cdot l_{wf2}$
  machining shape element string: $l_{pf1} \cdot l_{pf2}$
Inner diameter machining area 2
  blank shape element string: $l_{wf3} \cdot l_{wf4} \cdot l_{wf5}$
  machining shape element string: $l_{pf3}$ The symbol $l_{wf1}$ indicates a blank shape element which is newly produced by the boundary line of the inner diameter machining scope, and the symbol $l_{wf2}$ the blank shape element produced by separation of $l_{w'2}$ by boundary line of the inner machining scope where relations below hold.

$$l_{pf1} = l_{p3}$$

$$l_{pf2} = l_{p2}$$

$$l_{wf3} = l_{w'3}$$

$$l_{wf4} = l_{w4}$$

$$l_{wf5} = l_{w'5}$$

$$l_{pf3} = l_{p6}$$

Figure 10B:
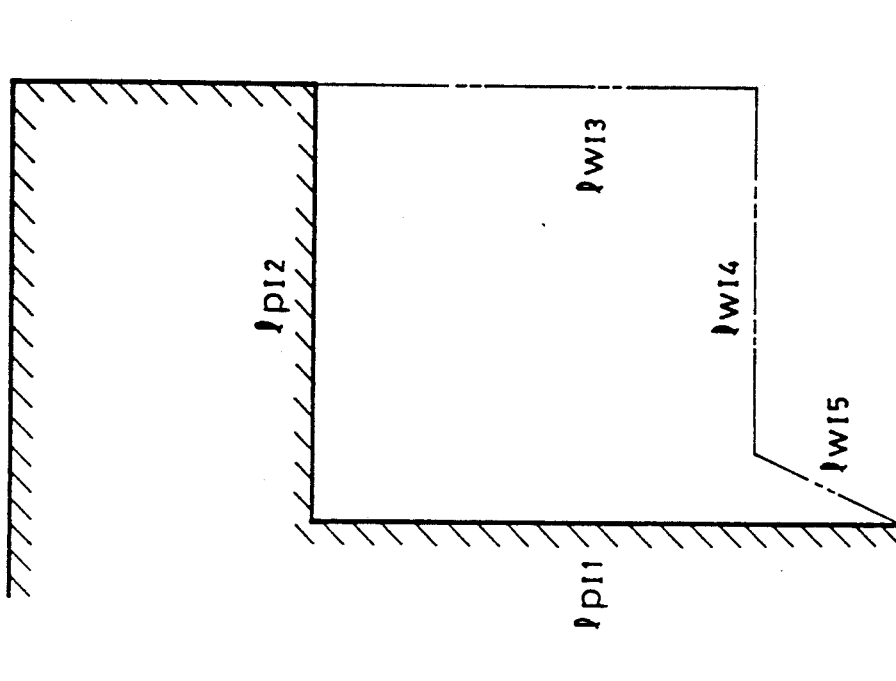
FIGS. 10A and 10B show examples of renewal of the machining areas.
Figure 10A:
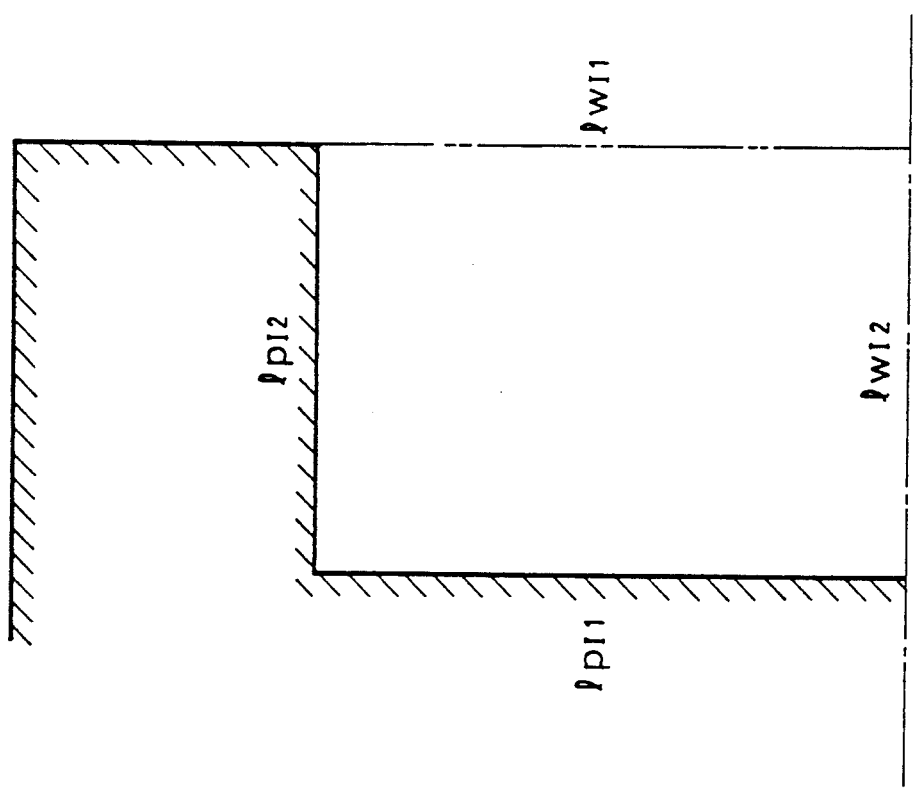

Then, the processor 1 generates machining steps for the inner diameter machining area, but description will first be made on the definition of a machining scope and on the renewal method of a machining area. The machining scope is these areas within the machining area which should be cut off by the step. In the steps using a drill or an end mill, it means the portions where the tool shape overlaps the machining area when a tool with a predetermined diameter is moved from a starting point to an end point. More specifically, they are the portions shaded in FIGS. 9A through 9C. The renewal of the machining area means the step of removing the determined machining scope from the machining area. Referring to the machining shape/blank shape and the machining area shown in FIG. 9A, as shown in FIG. 10A.

Inner diameter machining area
  blank shape element string: $l_{wf1} \cdot l_{wf2}$
  machining shape element string: $l_{pf1} \cdot l_{pf2}$
is renewed as follows (FIG. 10B):
Inner diameter machining area
  blank shape element string: $l_{wf3} \cdot l_{wf4} \cdot l_{wf5}$
  machining shape element string: $l_{pf1} \cdot l_{pf2}$ The method of machining step generating for the inner diameter machining area will now be described referring to the flowcharts shown in FIGS. 11 through 15B. All the processings such as judgement in the following description are conducted by the processor 1.

In Step S1, a judgement is made as to whether or not the machining shape elements forming an inner diameter machining other than the longitudinal/end face exist on a diameter smaller than the minimum machining diameter (referred to as $\alpha$ hereinafter) of the lathe turning tool which has been stored in the parameter memory 7 in advance, and if there is no such machining shape element, the step proceeds to Step S3 but if such an element exists within the diameter, the step proceeds to Step S2. At Step S2, taper/arc (including chamfer/rounding) on a diameter smaller than the minimum machining diameter $\alpha$ must be machined in the boring process, but as it is impossible to completely cut without leaving some area unless a forming tool is used, such an incomplete cut should be kept minimum. The machining shape is corrected by forming a virtual machining shape element by connecting a vertical extension of an end face element from the point $X=\alpha$ with an extension of the longitudinal element existing in the area $X<\alpha$ but having the minimal X value on the machining shape. Through these steps, the machining shape and the machining area shown in FIGS. 16A and 17A are corrected as shown in FIGS. 16B and 17B respectively. If there is no such longitudinal element in the region of $X<\alpha$, $X=0$ is used as the longitudinal element.

Figures 1, 12A:
Figures 2, 12A:
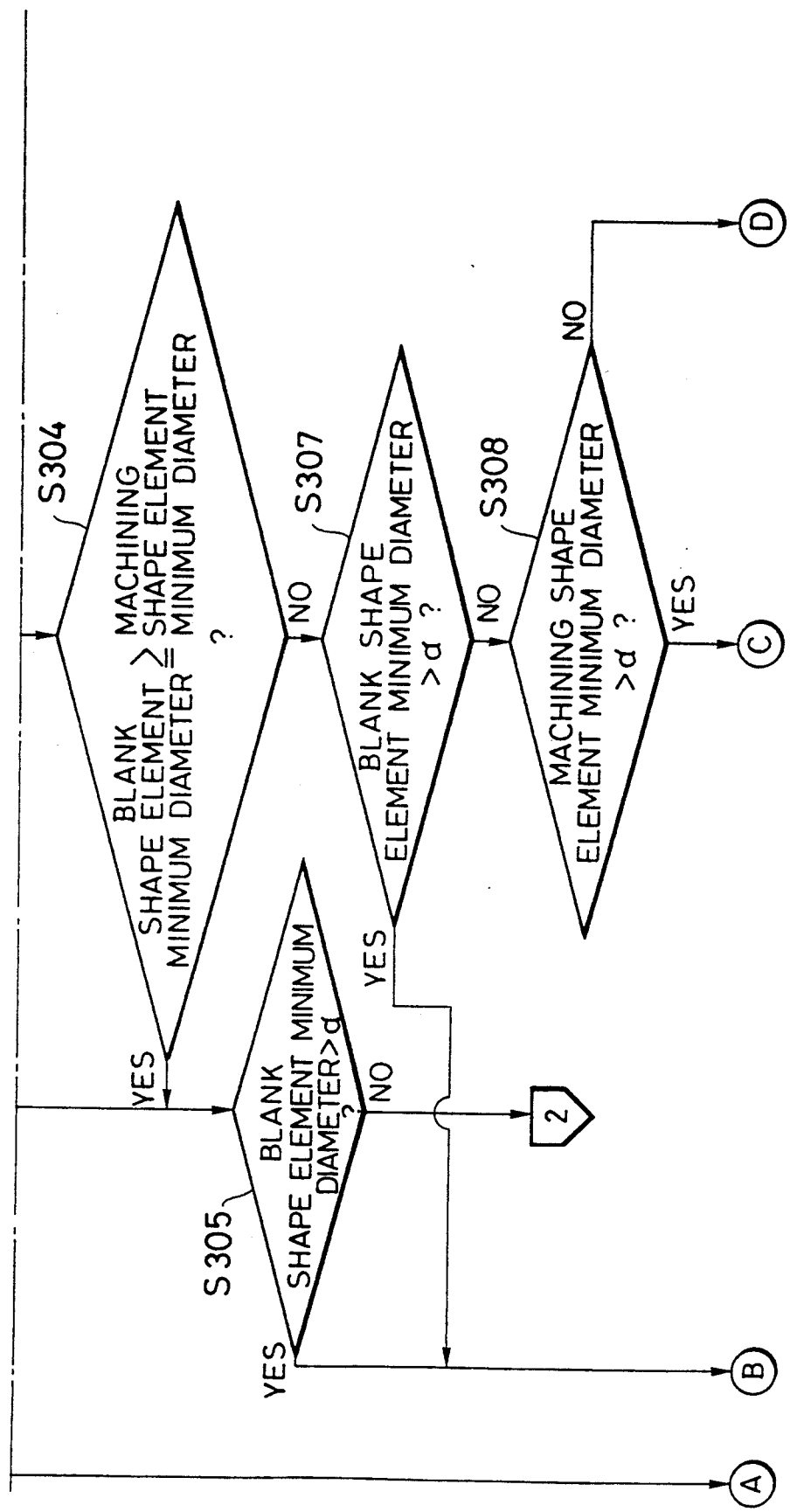
Figure 12B:
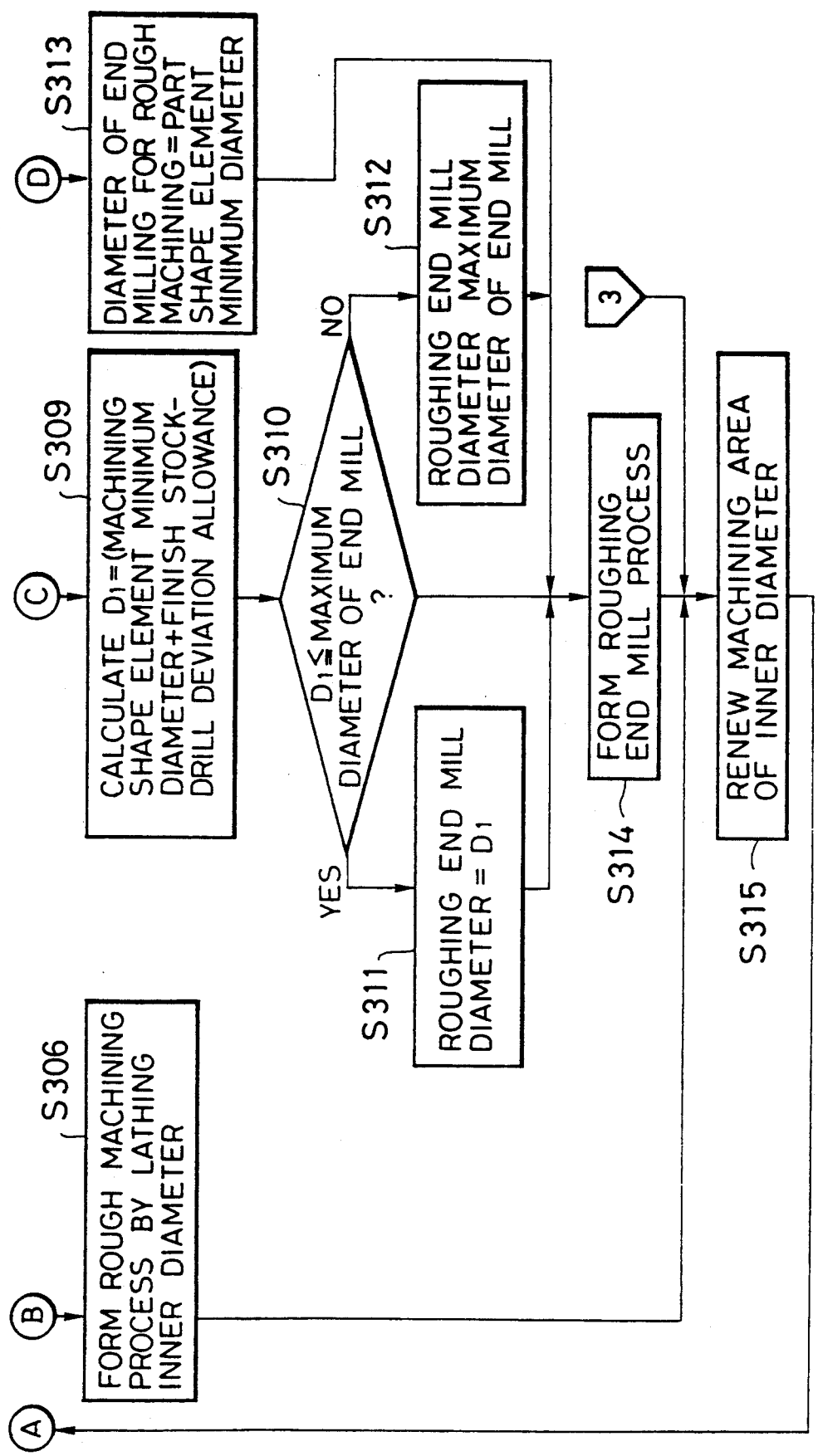
Figure 12C:
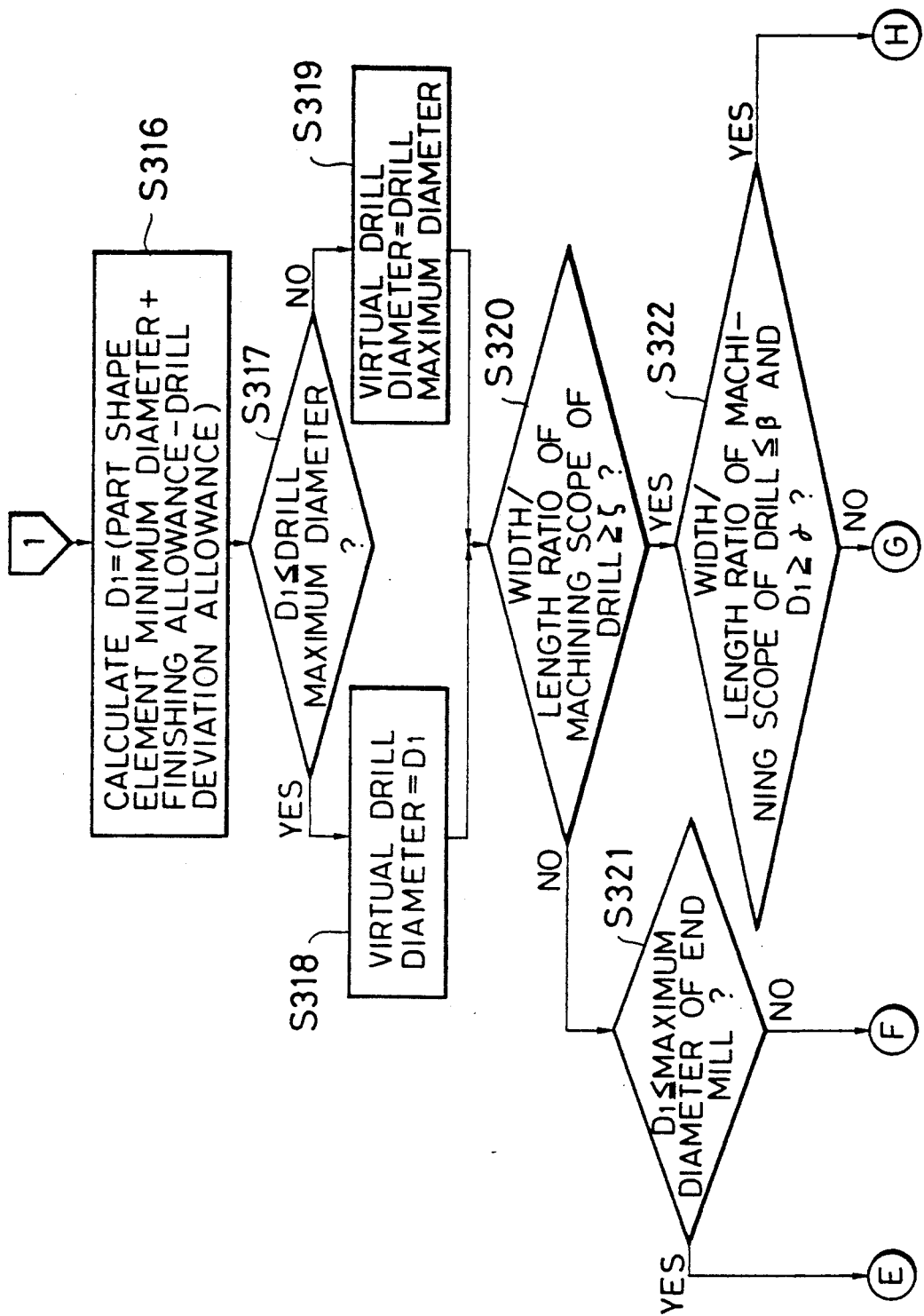
Figure 12D:
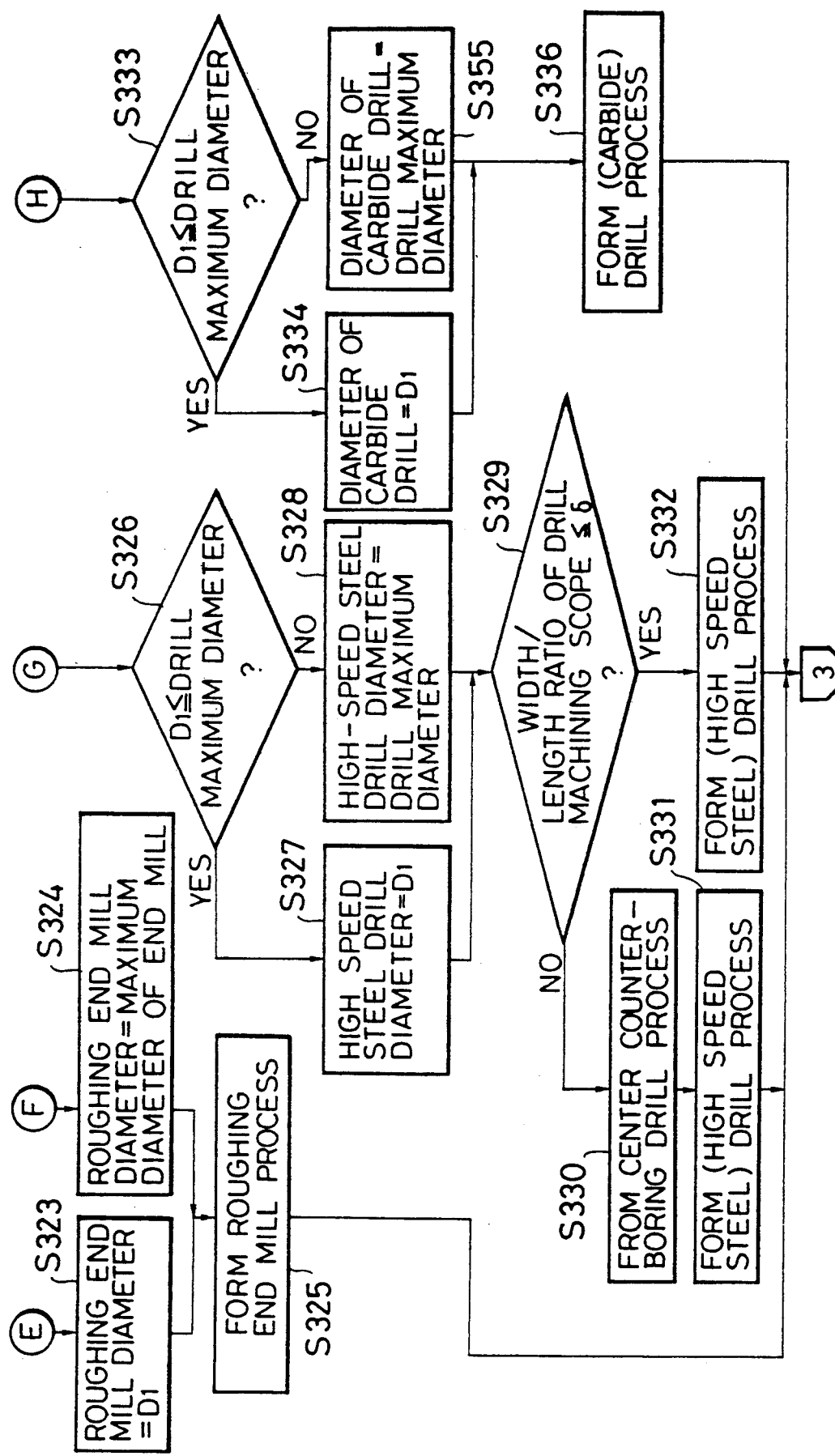
Figure 12E:
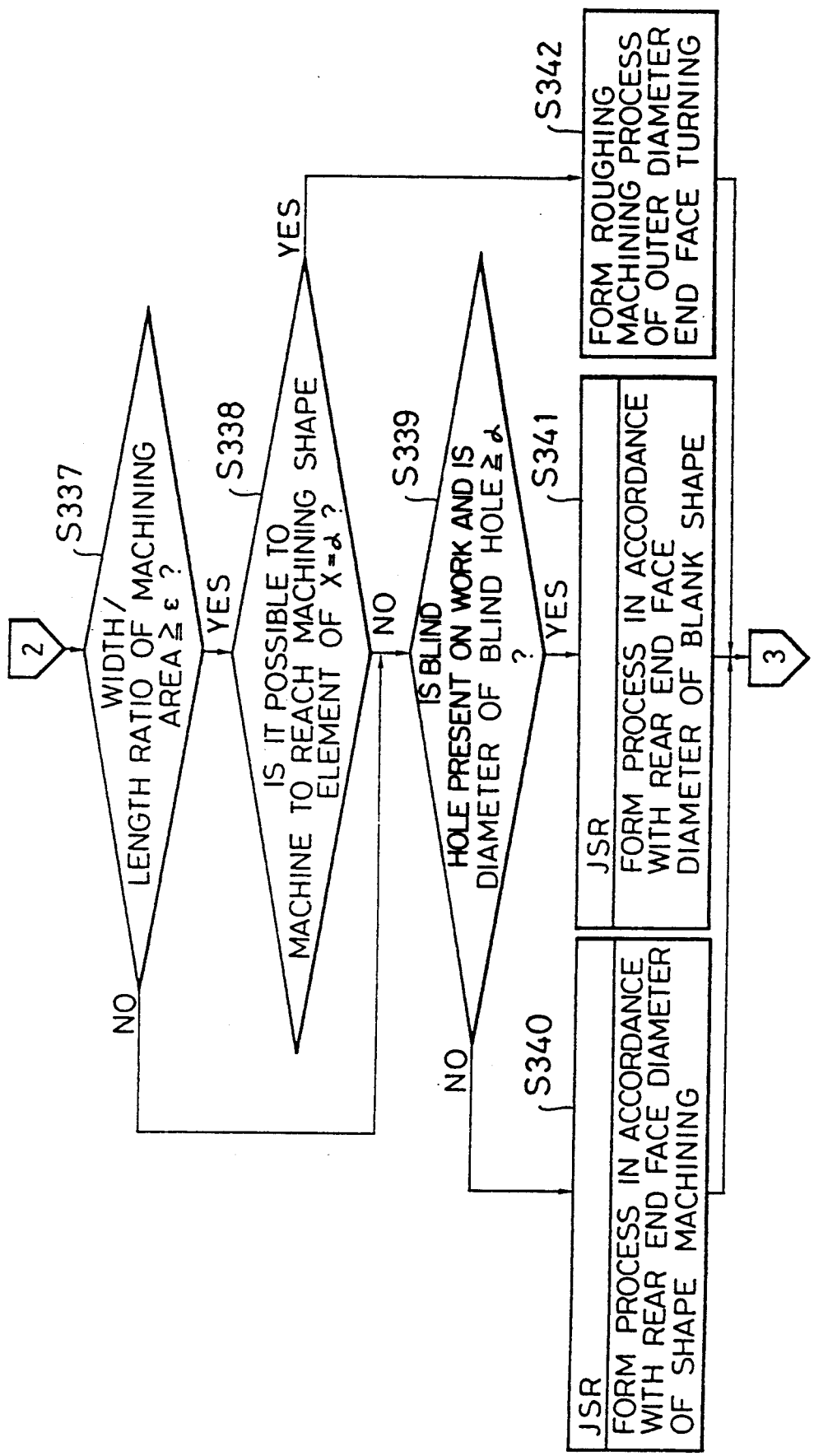

At Step S3, the step jumps to the subroutine shown in FIGS. 12A through 12C for forming the inner diameter rough machining step.

At Step S301, it is judged whether or not an inner diameter machining area exists, and if not, the process returns to the step (or Step S4) immediately after Step S3, and if it does, the step proceeds to Step S302. Whether or not a machining area exists is judged by judging if there exists a shape element string by offsetting overlapping of the machining shape elements and the blank shape elements in a machining area. A machining area in the rough machining means a machining area obtained by assuming the final machining shape plus a finishing allowance as the machining shape, the machining shape in the rough machining means herein the machining shape including the finish stock. At Step S302 a judgement is made as to, whether or not there is a through hole bored on the machining shape, and if there is no hole, the process advance to Step S305, but if there is a through hole, it goes to Step S303. At Step S303 a judgement is made as to, whether or not a through hole exists on the blank shape and if not, since the machining shape is a bored through hole, it is recognized as a machining area characteristic to the inner diameter machining with an unprocessed through hole, and the process goes to Step S316 in FIG. 12B which indicates the method for machining such an area. Otherwise, the process goes to Step S304. At the Step S304, the minimum value (referred to as the blank shape element minimum diameter) of the blank shape elements forming the inner diameter machining area in the X direction is compared with the minimum value (referred to as the machining shape element minimum diameter) of the machining shape elements in the X direction. If the minimum diameter of the blank shape elements is the smaller of the two values, it is judged that there is a through hole in the blank, and that a machining area should exist at the through hole, and the process goes to Step S307. Otherwise, it goes to Step S305. It is judged at Step S305 that the machining area exists only on the portion of a blind hole or on what may be recognized as the blind hole, and that it is not necessary to machine the through hole of the part even if there is one. In Step S305 the blank shape element minimum diameter in the inner diameter machining area is compared with $\alpha$, and if the minimum diameter is larger than $\alpha$, the whole machining area is judged to be machinable by lathing the inner diameter. Steps for the rough machining by turning are formed (Step S306), and then the process goes to Step S315. Otherwise, it is recognized as the machining area characteristic to the inner diameter machining with a rear end face, and the process advances to Step S335 of FIG. 12C which indicates the machining method for such an area. At Step S307, a comparison is made between the blank shape element minimum diameter of the inner diameter machining area and $\alpha$. If the blank shape element minimum diameter is larger than $\alpha$, the whole machining area is judged to be machinable by turning the inner diameter, and the process advances to Step S306. Otherwise, it is recognized as the machining area characteristic to the inner diameter machining with the through hole in the blank, and the process goes to Step S308.

Referring now to FIG. 18A, the process of Step S308 and thereafter will be explained. At Step S308, the machining shape element minimum diameter in the machining area characteristic to the inner diameter machining is compared with $\alpha$. If the machining shape element minimum diameter is larger than $\alpha$, or if the X coordinate at $l_{pl1} > \alpha$, it is judged that the portion of the machining shape element minimum diameter could be improved in surface roughness due to rough machining by end milling and turning, and the process proceeds to Step S309. Otherwise, it is judged that the portion of the part shape element minimum diameter can only be roughly machined by end milling alone. The diameter of the end milling for the rough machining for determining the scope is set as the machining shape element minimum diameter (Step S313), and the process goes to Step S314. At the Step S309, a calculation is made as follows.

$D_1$ = (final machining shape element minimum diameter − drill deviation allowance)

= (machining shape element minimum diameter + finish stock − drill deviation allowance)

The drill deviation allowance means the maximum value of deviation by a twist drill or an end mill during a boring operation. The numeral $D_1$ indicates the maximum diameter of the tool which can machine without lowering cutting conditions. At Step S310, the diameter $D_1$ is compared with the maximum diameter stored in the parameter memory 7 in advance for an end mill which is attachable on the machine, and if the value $D_1$ is smaller than the end mill maximum diameter, the relationship is set as the roughing end mill diameter = $D_1$ (Step S311). Otherwise, the roughing end mill diameter = (end mill maximum diameter), and an arrangement is made to use an end mill having the largest possible diameter which is still mountable on the machine (Step S312). At Step S314, the machining scope is determined based on the tool diameter determined at Step S311, S312 or S313 (see FIG. 18B), and the types and scope of the machining are stored in the temporary memory 4. At Step S315, the machining area is renewed based on the determined machining scope (FIG. 18C) and the process returns to Step S301.

The steps after Step S316 of FIG. 12B for the machining area characteristic to the inner diameter machining with an unprocessed through hole will now be described referring to FIGS. 19A, 20A and 21A.

At Step S316, the diameter $D_1$ is calculated in a process similar to that of Step S309. At Step S317, the maximum diameter (referred to as the drill maximum diameter herein) of a drill mountable on the machine which has been stored in the parameter memory 7 is compared with the value $D_1$, and if the value $D_1$ is smaller than the maximum diameter, the relationship is set as the virtual drill diameter = $D_1$ (Step S318). Otherwise, the virtual drill diameter is set at the maximum drill diameter, and a drill having diameter as large as possible is assumed (Step S319). The virtual drill diameter is determined at Steps S320 and S322 for allowing a judgement based on the machining scope of the assumed drill. At Step S320, the quotient (referred to as the width/length ratio) obtained by dividing the length of the machining scope by the assumed drill in the Z direction with the maximum coordinate in the X direction is compared with the minimum width/length ratio (expressed by the symbol $\zeta$) stored in the parameter memory 7 in advance for the machining scope which requires machining by a drill, and if the width/length ratio in the assumed drill machining scope is less than $\zeta$, the machining scope is judged too shallow and no drilling is necessary, and the process advances to Step S321. Otherwise, it is judged that drill machining is necessary and the process goes to Step S322.

At the Step S321, the value $D_1$ is compared with the maximum end mill diameter, and if the value $D_1$ is smaller than the maximum end mill diameter, the relationship is set that roughing end mill diameter = $D_1$ (Step S323). Otherwise, the roughing end mill diameter is set at the maximum end mill diameter, and an arrangement is made to use an end mill having the largest possible diameter still mountable on the machine (Step S324). At Step S325, based on the tool diameter determined at Steps S323 and S324, the machining scope is determined (see FIG. 19B) and the types and the scope of the machining are stored in the temporary memory 4, and the process goes to Step S315 in FIG. 12A. At Step S322, a comparison is made between the width/length ratio of the drill machining scope and the width/length ratio (referred to as the symbol $\beta$ herein) stored in advance in the parameter memory 7 for the machining scope in which a carbide drill is usable and between the minimum diameter (referred to as the symbol $\gamma$) of the carbide drill stored in the parameter memory 7 and the value $D_1$. If the width/length ratio of the drill machining scope is smaller than $\beta$ and yet the value $D_1$ is larger than $\gamma$, it is judged that a carbide drill can be used, and the process advances to Step S333. Otherwise, it is judged that a high-speed steel drill is suitable and the process goes to Step S326. At Step S326, the value $D_1$ is compared with the maximum drill diameter, and if $D_1$ is smaller than the maximum drill diameter, the high-speed steel drill diameter is set as $D_1$ (Step S327). Otherwise, the high-speed steel drill diameter is set as the maximum drill diameter, and a drill having the largest possible diameter and still mountable on the machine is selected (Step S328). At Step S329, the width/length ratio of the drill machining scope is compared with that (expressed by the symbol $\delta$) of the machining scope where a center machining is required, and if it is judged that the machining scope is too shallow to require the center machining, than the process advances to Step S322. Otherwise, it is judged that the center machining is necessary and the process goes to Step S330.

At Step S330, the machining scope is determined based on the shape data of a center machining drill stored in the parameter memory 7 in advance (see FIG. 20B), and the types and the scope of the machining are stored in the temporary memory 4. At Steps S331 and S332, the machining scope is determined based on the tool diameter determined at Step S327 or S328 (FIG. 20B), and types and scope of the machining are stored in the temporary memory 4, and the process advances to Step S315 as shown in FIG. 12A.

At Step S333, the value $D_1$ is compared with the maximum drill diameter, and if the value $D_1$ is smaller than the maximum drill diameter, the diameter of the carbide drill is set at the value $D_1$ (Step S334). Otherwise, it is set at the maximum drill diameter, and an arrangement is made to machine by a drill having the largest possible diameter and still mountable on the machine (Step S335). At Step S336, the machining scope is determined based on the tool diameter which is determined at Steps S334 and S335, and the types and scope the machining are stored in the temporary memory 4 and the process advances to Step S315 in FIG. 12A.

Further, Step S337 in FIG. 12C and the steps thereafter will be described with respect to the machining area characteristic to the inner diameter machining with a rear end face.

Figures 22A, 22B:
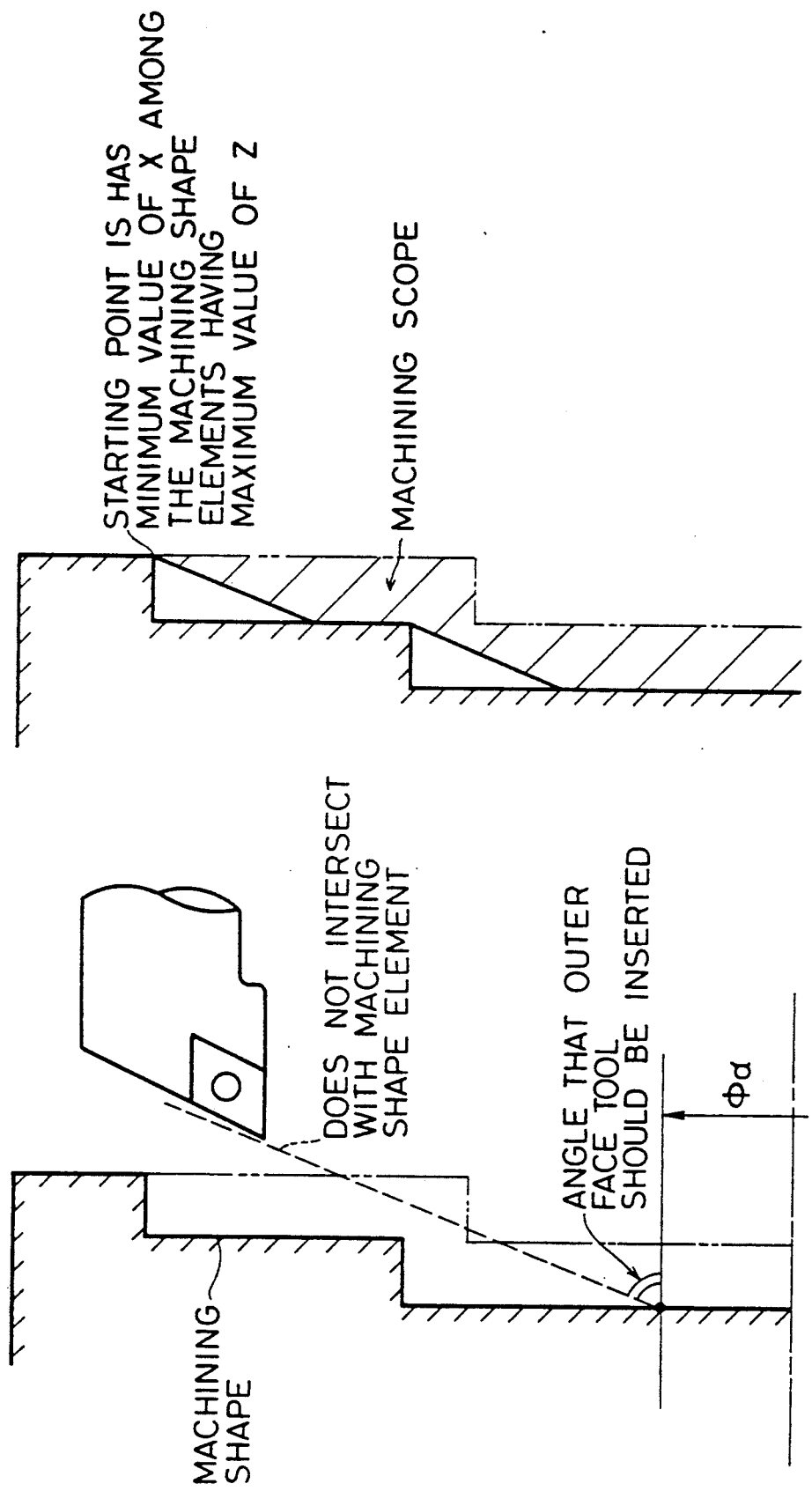
FIGS. 22A and 22B show examples of determining the scope for the inner diameter machining by an outer diameter and face tool.
Figures 23A, 23B:
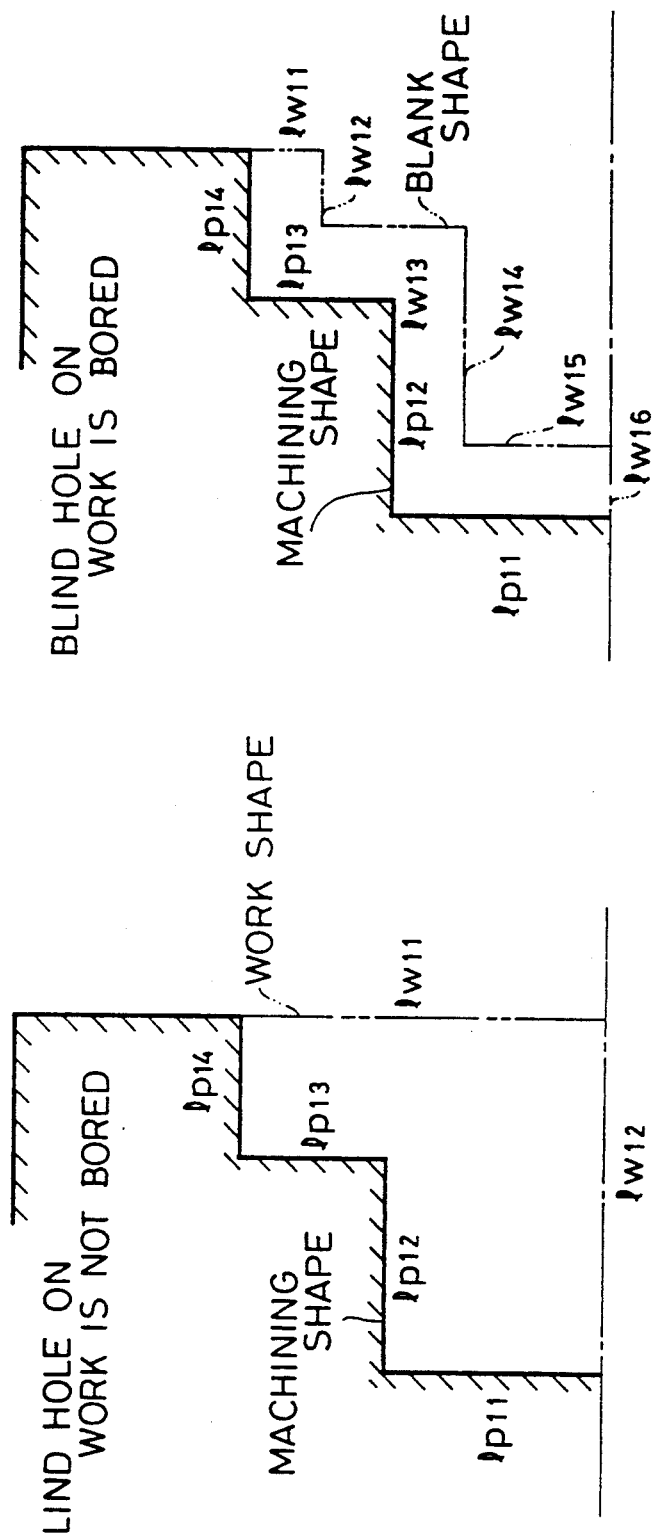
FIGS. 23A and 23B show examples with and without a blind hole on the blank.
Figure 28A:
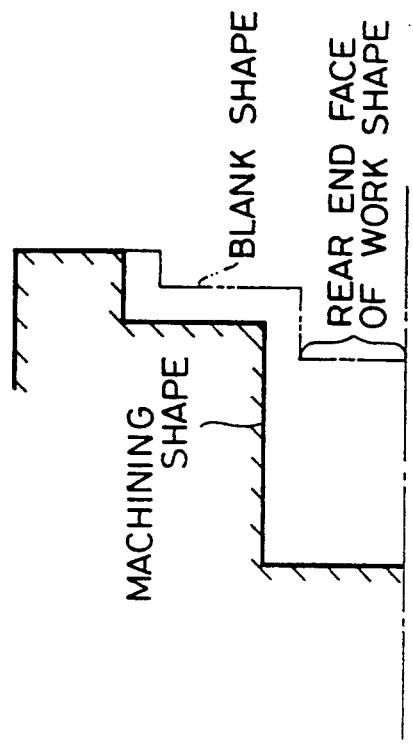
Figure 28B:
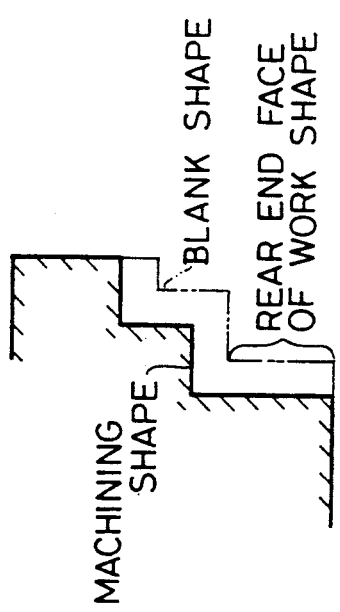
Figure 29A:
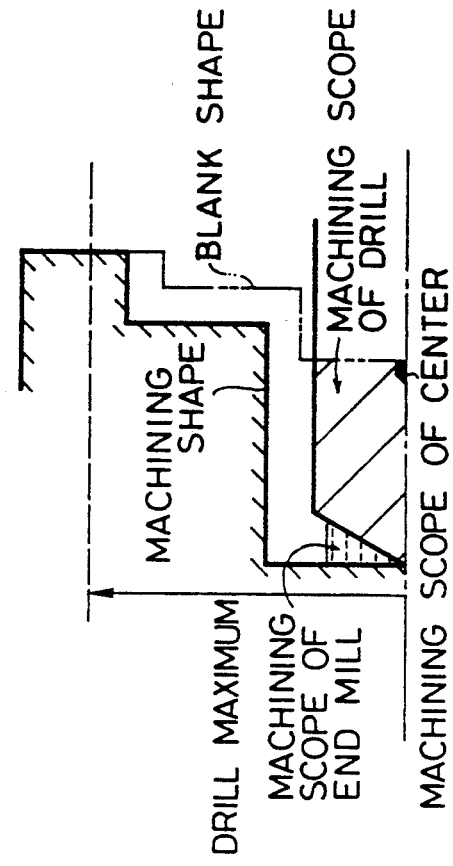
Figure 29B:
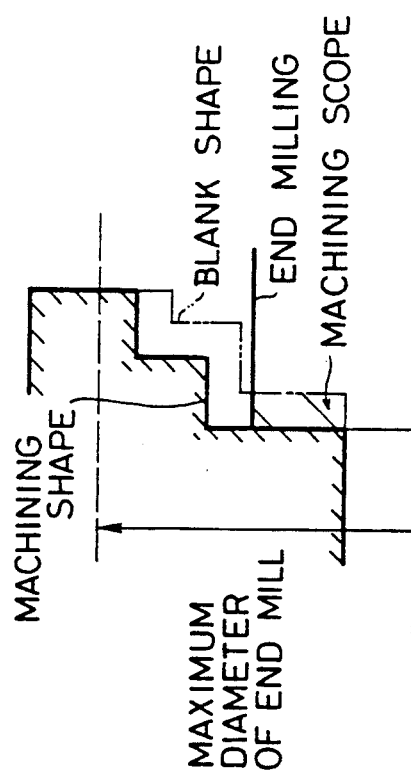
Figure 31A:
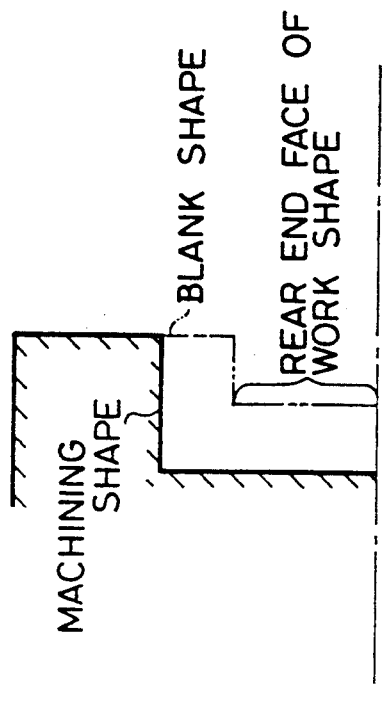
FIGS. 30A-30B, 31A-31B show examples of determining the scope of machining at the rear end face of the blank shape by a boring tool.
Figure 31B:
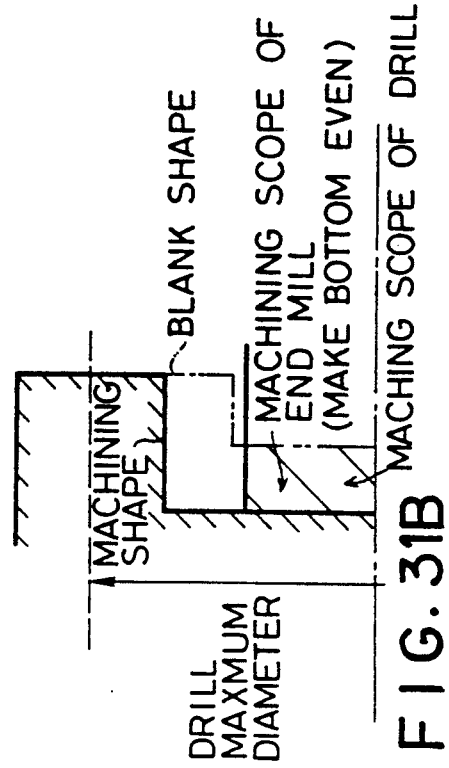
Figure 30A:
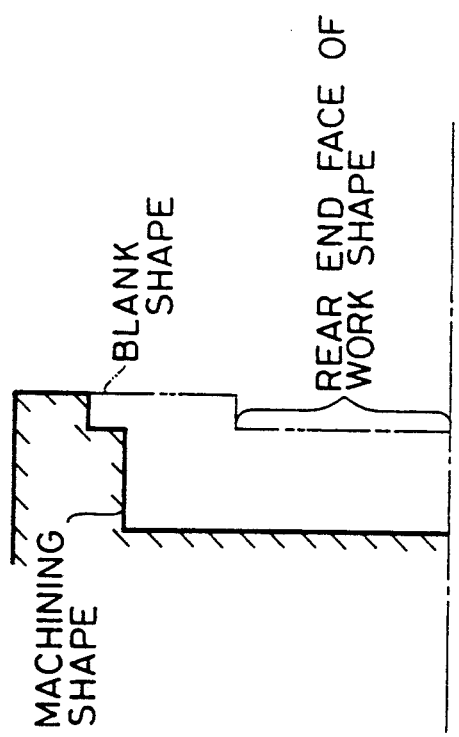
Figure 30B:
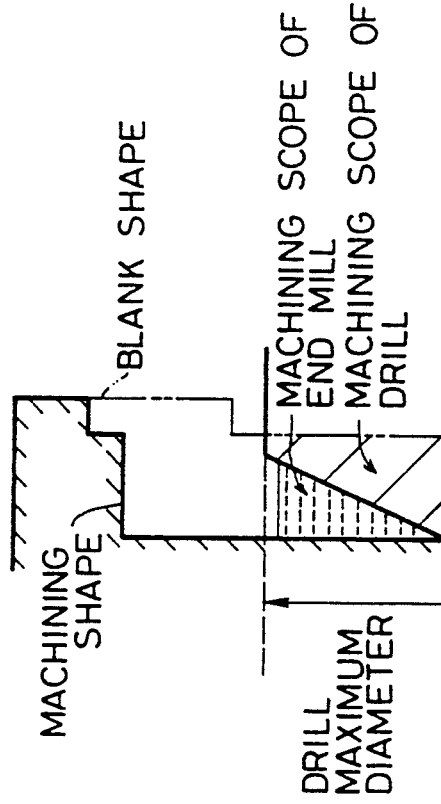

At Step S337, the quotient (referred to as the width-/length ratio) obtained by dividing the difference between the maximum value and the minimum value in the X direction of the machining area characteristic to the inner diameter machining with a rear end face with the difference between the maximum value and the minimum value in Z direction thereof is compared with the minimum value (expressed by the symbol $\epsilon$) of the width/length ratio in the machining area necessary to form steps for the outer diameter end face which has been stored in the parameter memory 7. At Step S338, it is judged whether or not a straight line extending from the point $X=\alpha$ on the machining shape as shown in FIG. 22A in the direction of an angle at which the tool for outer diameter end face may be insertable crosses the machining shape within the scope where $X > \alpha$. At the Steps S337 and S338, if the width/length ratio of the machining area is greater than $\epsilon$, and if the line does not crosses the machining shape within the scope $X > \alpha$, it is judged that the machining area is shallow but tool for outer diameter end face can be inserted to reach the portion where $X \geq \alpha$ in machining shape, and the process goes to Step S342. Otherwise, it is judged that the machining with an outer diameter end face tool is not suitable, and the process goes to Step S339. At Step S342, the scope of turning on the outer diameter end face is determined as shown in FIG. 22B, and the types and scope of the machining are stored at the temporary memory 4, and the process goes to Step S315 as shown in FIG. 12A. At Step S339, it is judged whether or not a blind hole is bored on the blank depending on the presence or absence of plural end face elements on the blank shape as shown in FIG. 23, and the maximum value in the X direction of the end face elements of the work having the minimum value in the Z direction is compared with the value $\alpha$. If there is the blind hole on the blank and if the maximum value in the X direction of the end face element of the blank which has the minimum value in the Z direction is larger than the value $\alpha$, it is judged that boring should be conducted only on the rear end face of the blank shape for higher efficiency because the time needed for cutting feed is shorter, and the process goes to Step S341. Otherwise, it is judged that the machining by inner diameter turning cannot be achieved only with the boring of the rear end face thereof, and the process goes to Step S340 in order to form steps corresponding to the machining shape.

Figure 13A:
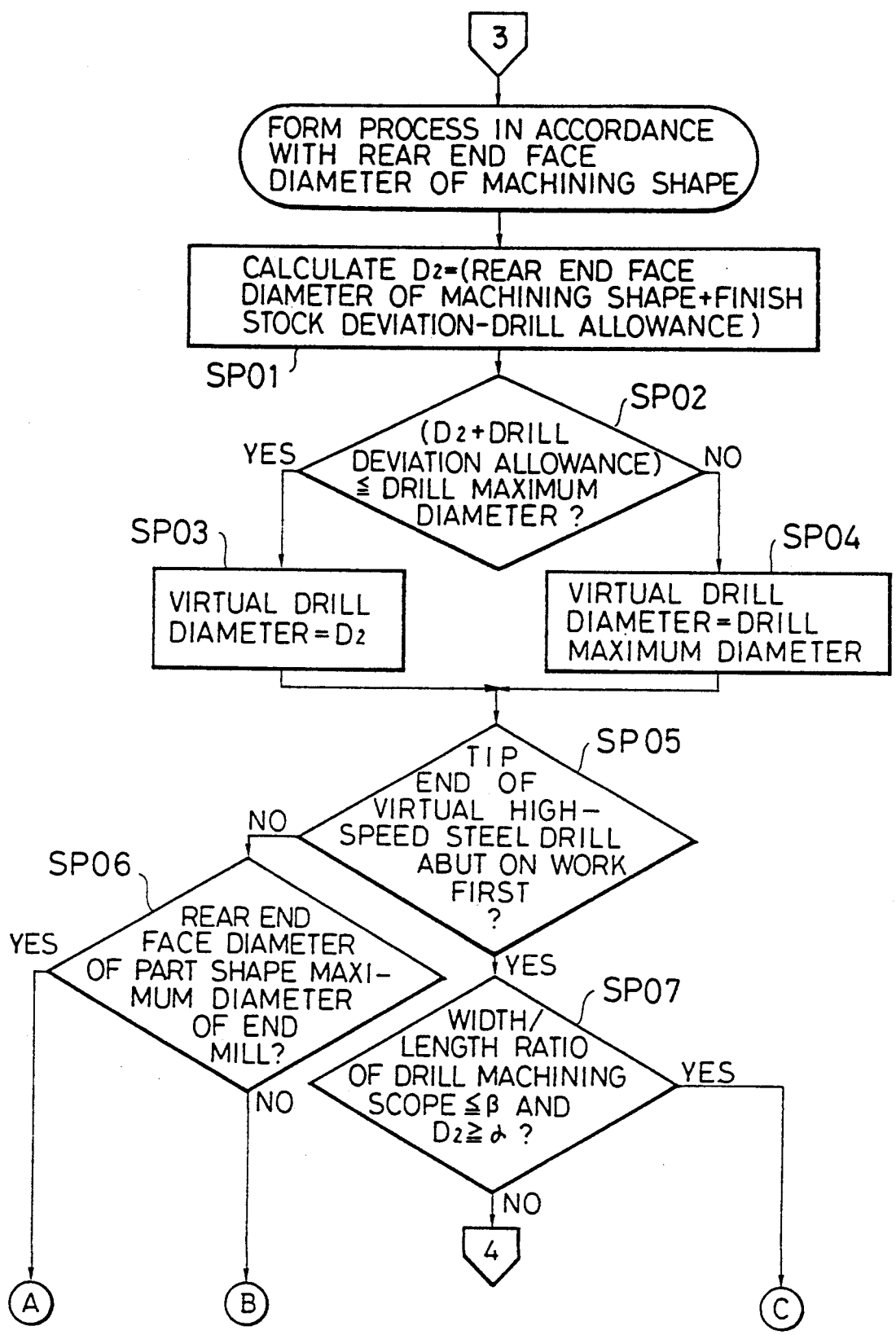
Figure 13B:
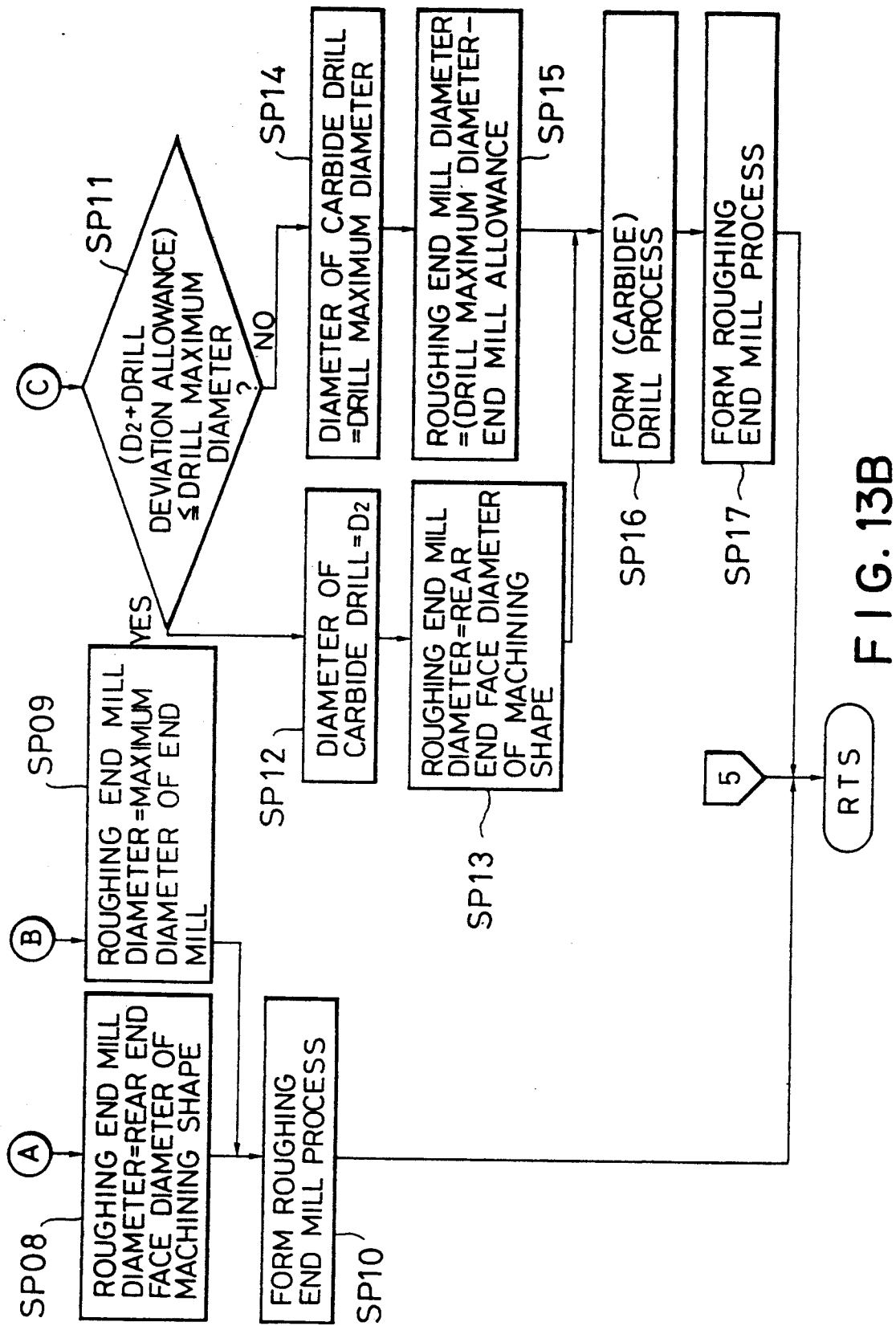
Figure 13C:
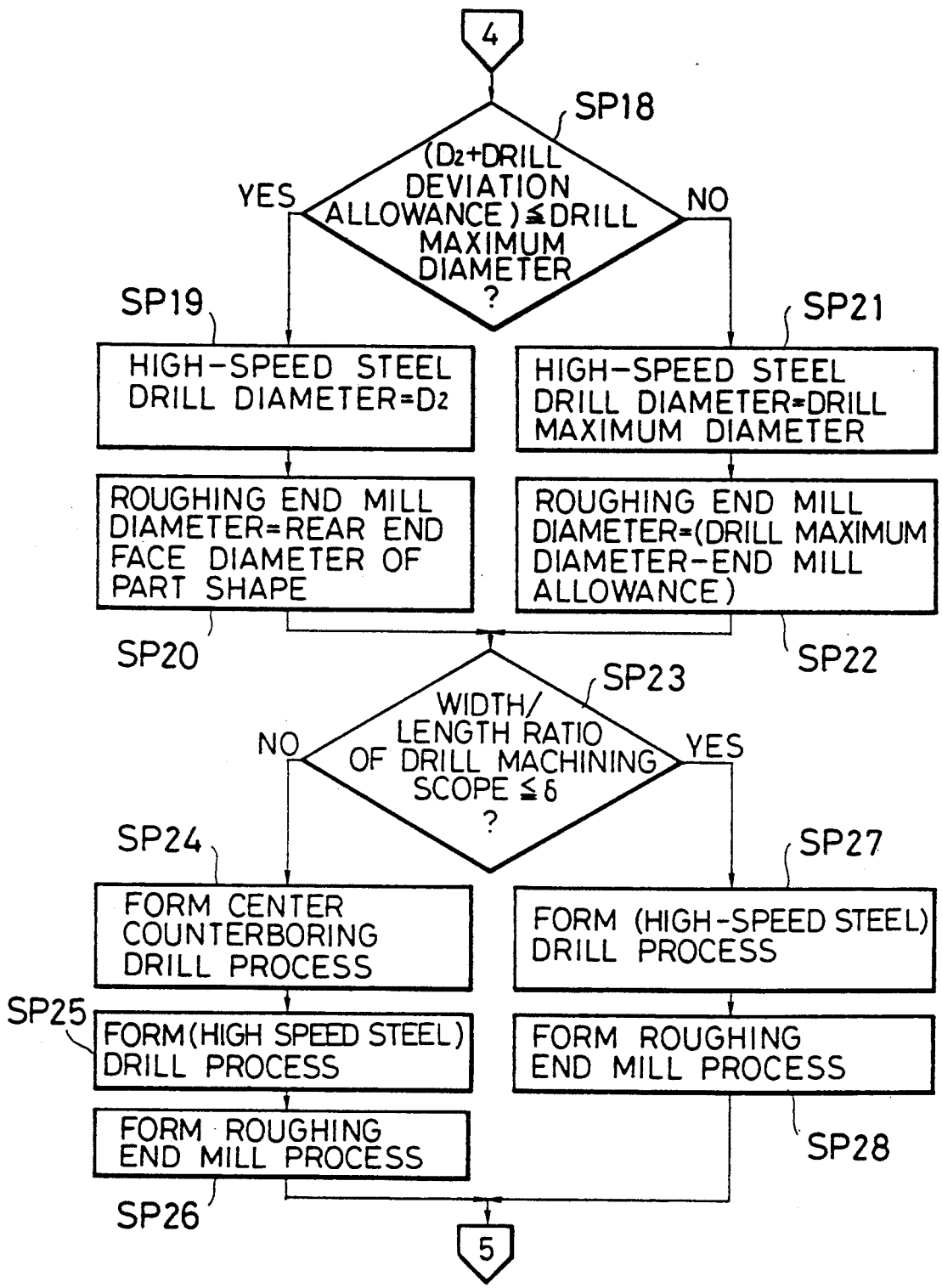

The jump takes place to the subroutine shown in FIGS. 13A and 13B at Step S340. For the following description of Steps SP01 and the steps thereafter, FIGS. 24A through 27A are referred to.

At Step SP01, a calculation is made as follows;

$D_2$ = (rear end face diameter of the final machining shape — drill deviation allowance)
= (rear end face diameter of the machining shape + finish stock — drill deviation allowance)

At Step SP02, ($D_2$+Drill deviation allowance) is compared with the maximum drill diameter, and if the former is smaller than the maximum drill diameter, the virtual drill diameter is set at the value $D_2$ (Step SP03). Otherwise, it is set at the maximum drill diameter, and a drill having the largest possible diameter is assumed (Step SP04). At step SP05, a high-speed steel drill having an assumed diameter is assumed, and whether or not the tip end thereof abuts on the blank at the start of machining is judged. If it does, it is judged the drill machining is suitable, and the process goes to Step SP07. Otherwise, the drill machining is judged unsuitable, and the process goes to Step SP06.

At Step SP06, the rear end face diameter of the machining shape is compared with the maximum end mill diameter. If the former is less than the maximum end mill diameter, the roughing end mill diameter is set at the rear end face diameter of the machining shape (Step SP08). Otherwise, it is set as the maximum end mill diameter, and an arrangement is made so as to machine with an end mill having the largest possible diameter and still mountable on the machine (Step SP09). At Step SP10, the machining scope is determined based on the tool diameter determined at Steps SP08 and SP09 (see FIG. 24B), and the types and scope of the machining are stored in the temporary memory 4, and the process returns to the step immediately after Step S340 in FIG. 12C. More particularly, it goes to Step S315 of FIG. 12A. At Step SP07, a comparison is made between the width/length ratio in the drill machining scope and $\beta$, and between $D_2$ and $\gamma$. If the width/length ratio is less than the value $\beta$ and yet the value $D_2$ is larger than the value $\gamma$, it is judged that a carbide drill could be used, and the process advances to Step SP11. Otherwise, a high-speed steel drill is judged suitable and the process goes to Step SP18 of FIG. 13B. At Step SP18, ($D_2$+drill deviation allowance) is compared with the maximum drill diameter, and if the former is less than the maximum drill diameter, the high-speed steel drill diameter is set at the value $D_2$ (Step SP19). For flattening the bottom face of the hole after boring it with a drill, the roughing end mill diameter is set at the rear end face diameter (Step SP20) of the machining shape. By roughing the rear end face of the machining shape with a drill and an end mill alone, the number of necessary steps is kept minimal. Otherwise, the diameter of the high-speed steel drill is set as the maximum drill diameter (Step SP21), and the roughing end mill diameter is set at the value obtained by (maximum drill diameter−end mill allowance) (Step SP22) so that the machining is conducted with a drill having the largest possible diameter and with an end mill with a diameter suitable to minimize the distance the cutter should travel. At Step SP23, the width/length ratio of the drill machining scope is compared with the value $\delta$, and if the ratio is less than the value $\delta$, it is judged that the machining scope is too shallow to require the center machining, and the process goes to Step SP27. Otherwise, the center machining is judged necessary, and the process advances to Step SP24. At Step SP24, the machining scope is determined based on the shape data of the center machining drill which have been stored in the parameter memory 7 (see FIG. 25B), and the types and scope of the machining are stored in the temporary memory 4. At Step SP25, the machining scope is determined based on the tool diameter determined at Step SP19 or SP21 (see FIG. 25B), and the types and scope of the machining are stored in the temporary memory 4. At Step SP26, the machining scope is determined based on the tool diameter determined at Step SP20 or SP22 (see FIG. 25B), and the types and scope of the machining are stored in the temporary memory 4, and the process returns to the step immediately after Step S340 of FIG. 12C. More particularly, the process goes to Step S315 of FIG. 12A. At Step SP27, based on the tool diameter determined at Step SP19 or SP21, the machining scope is determined (FIG. 26B), and the types and scope of the machining are stored in the temporary memory 4. At Step SP28, based on the tool diameter determined at Step SP20 or SP22, the machining scope is determined (see FIG. 26B), and the types and scope of the machining are stored in the temporary memory 4, and the process returns to the step immediately after Step S340 in FIG. 12C, or Step S315.

At Step SP11, ($D_2$+drill deviation allowance) is compared with the maximum drill diameter, and if the former is less than the maximum drill diameter, the carbide drill diameter is set at the value $D_2$ (Step SP12), the roughing end mill diameter is set at the rear end face diameter of the machining shape (Step SP13) and the rear end face is roughly machined with a drill and an end mill alone so as to minimize the number of necessary steps. Otherwise, the diameter of the carbide drill is set at the maximum drill diameter (Step SP14) while the roughing end mill diameter is set at the value obtained by (drill maximum diameter−end mill allowance) (Step SP15). The drill machining is conducted by a drill having the largest possible diameter and by an end mill having a diameter suitable to the distance the cutter should travel. At Step SP16, based on the tool diameter determined at Step SP12 or SP14, the machining scope is determined (see FIG. 27B), and the types and scope of the machining are stored in the temporary memory 4. At Step SP17, based on the tool diameter determined at Step SP13 or SP15, the machining scope is determined (see FIG. 27B), and the types and scope of the machining are stored in the temporary memory 4. The process then returns to the step immediately after Step S340 of FIG. 12C, or the Step S315 of FIG. 12A.

Figure 14A:
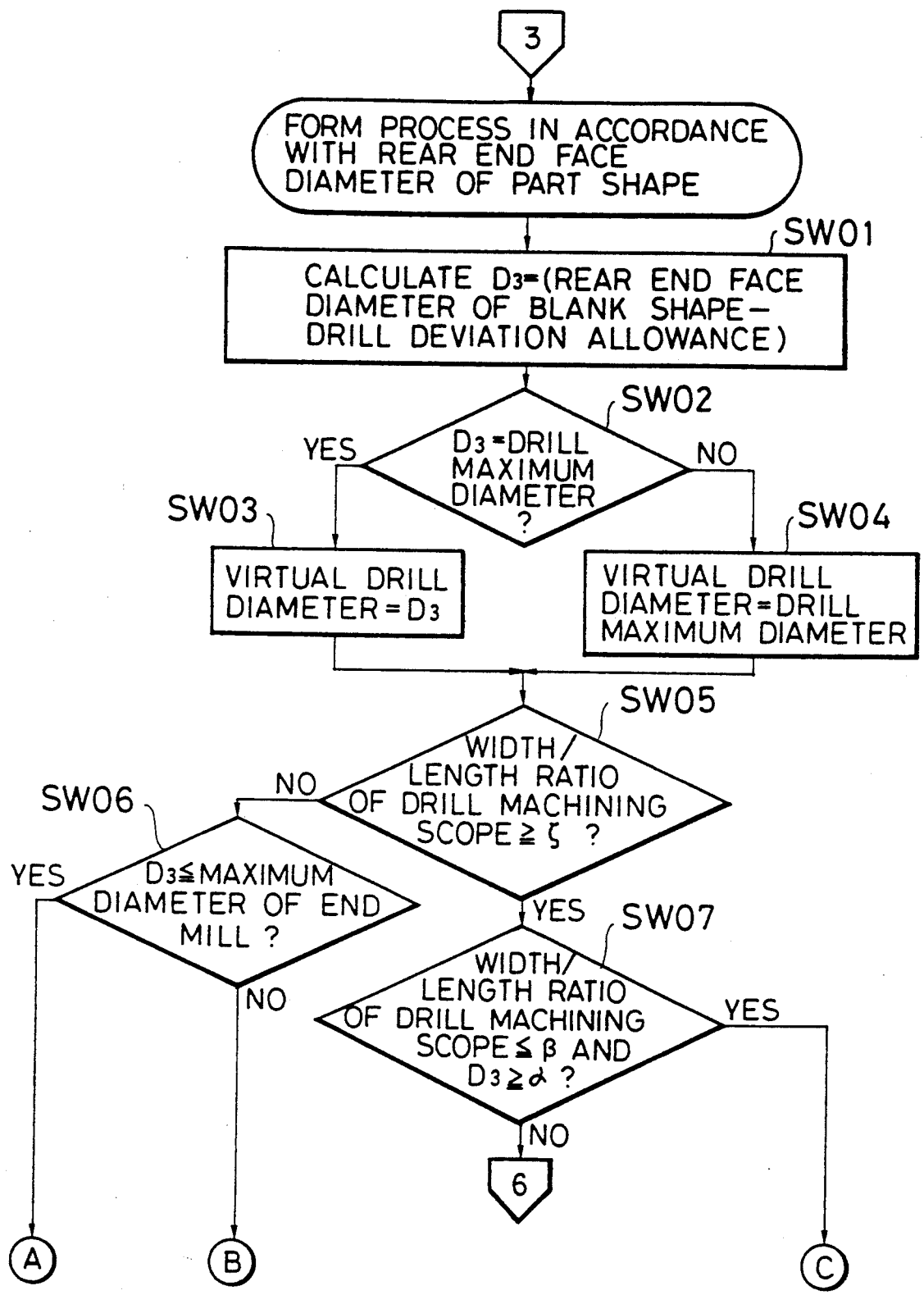
Figure 14B:
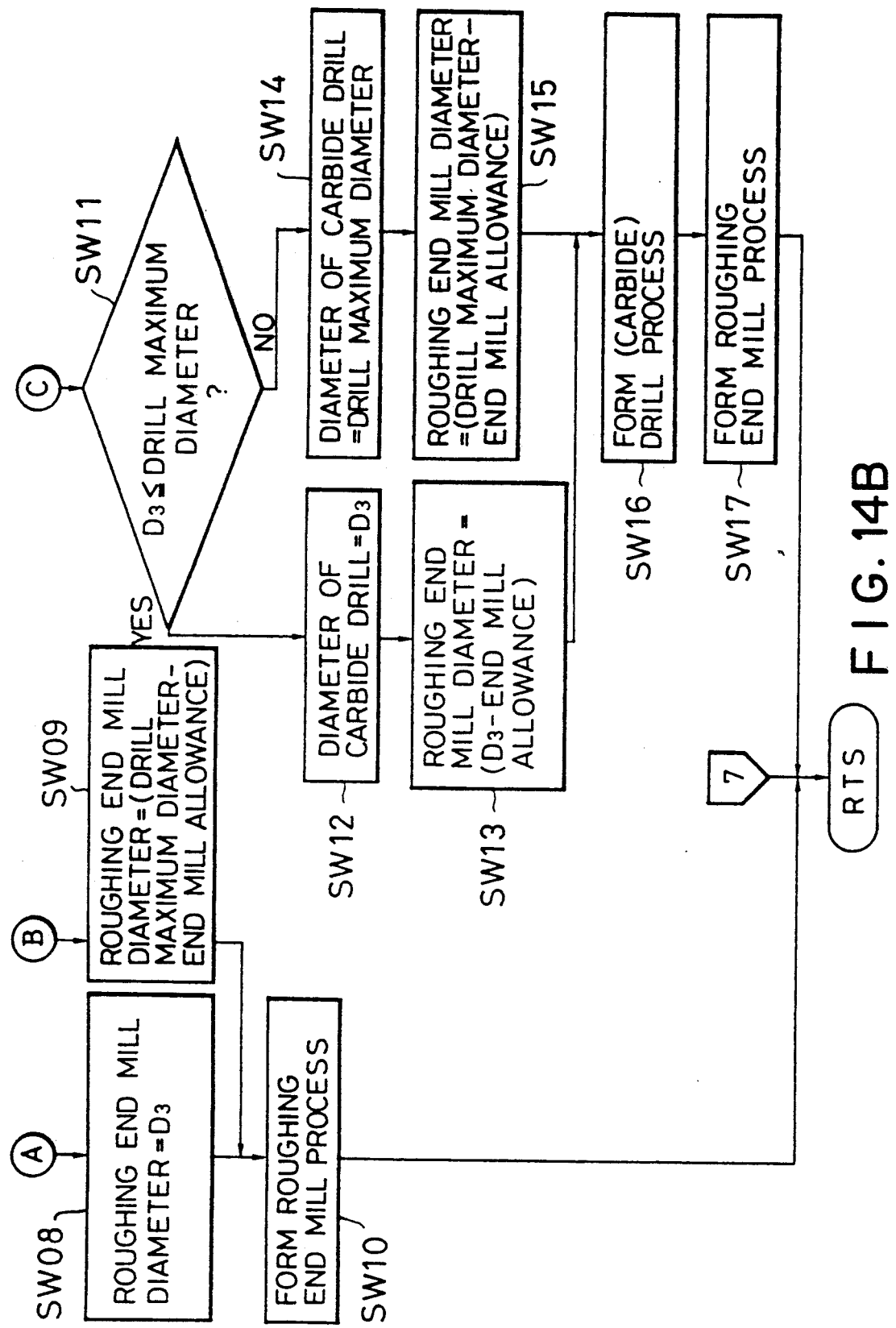
Figure 14C:
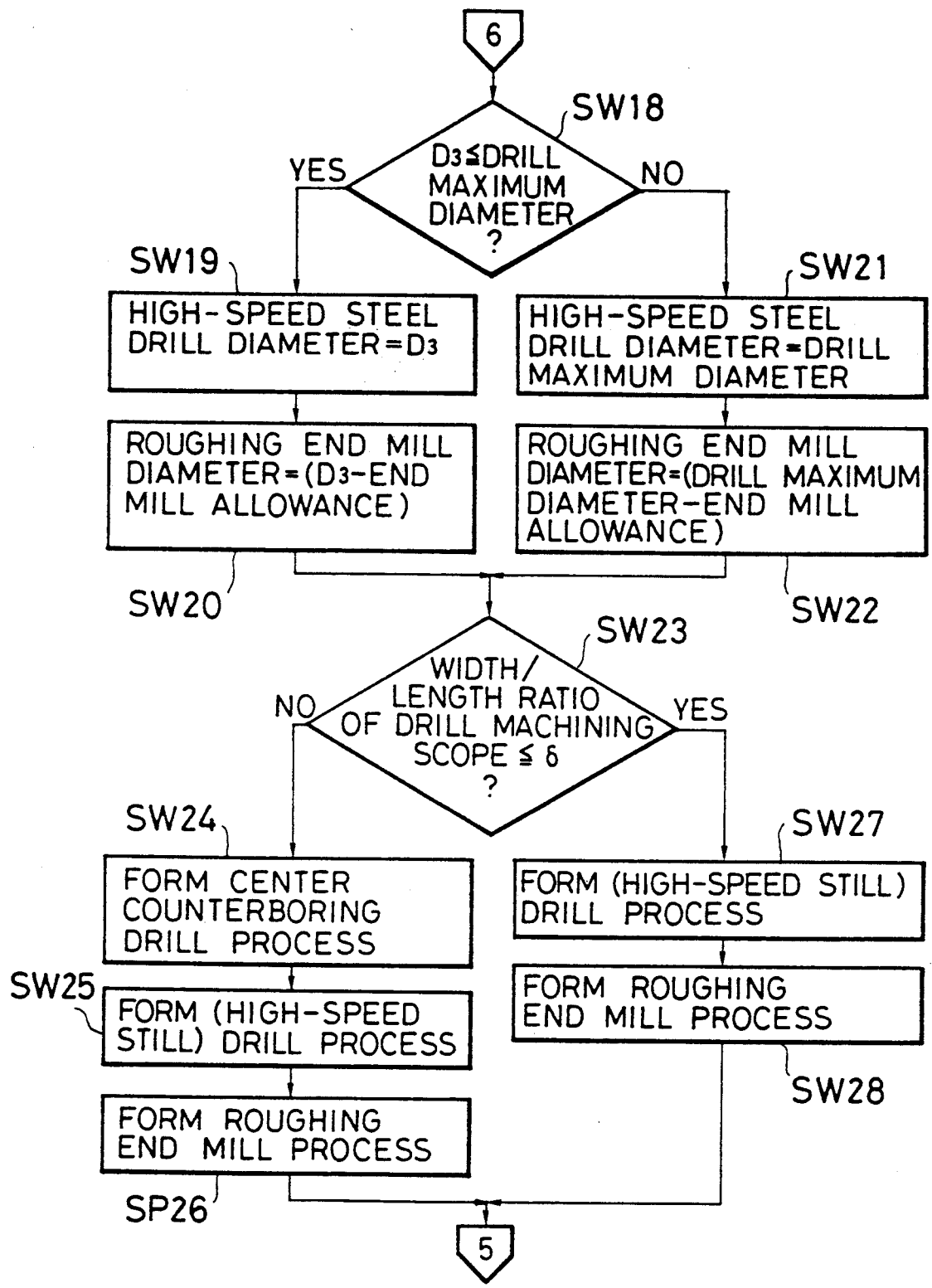

At Step S341 of FIG. 12C, the process jumps to the subroutine shown in FIGS. 14A and 14B. A description follows for the process of and after Step SW01 referring to FIG. 28A through FIG. 31A.

At Step SW01, a calculation is made for $D_3$=(rear end face diameter of the blank shape-drill deviation allowance). At Step SW02, the value $D_3$ is compared with the maximum drill diameter, and if the value $D_3$ is less than the maximum diameter, a virtual drill diameter is set at the value $D_3$ (Step SW03). Otherwise, the virtual drill diameter is set at the maximum drill diameter so as to assume a drill having the largest possible diameter (Step SW04). At Step SW05, the width/length ratio in the drill machining scope by an assumed drill is compared with the value $\zeta$. If the ratio is less than the value $\zeta$, it is judged that the machining scope is too shallow to require the drill machining, and the process advances to Step SW06. Otherwise, the drill machining is judged necessary and the process goes to Step SW07. At Step SW06, the value $D_3$ is compared with the maximum diameter of the end mill. If the former is less than the maximum end mill diameter, the roughing end mill diameter is set at the value $D_3$ (Step SW08). Otherwise, it is set at the maximum end mill diameter, and an arrangement is made to the machine with an end mill the largest possible diameter and still mountable on the machine (Step SW09). At Step SW10, the machining scope is determined based on the tool diameter determined at the Steps SW08 and SW09 (FIG. 28B), and the types and scope of the machining are stored in the temporary memory 4, and the process returns to a step immediately after Step S341 in FIG. 12C, or Step S315 of FIG. 12A. At Step SW07, a comparison is made between the width/length ratio of the drill machining scope and $\beta$, and between $D_3$ and $\gamma$. If the ratio is less than the value $\beta$ and yet the value $D_3$ is larger than the value $\gamma$, a carbide drill is judged usable and the process goes to Step SW11. Otherwise, a high-speed steel drill is judged more suitable and the process goes to Step SW18 of FIG. 14B.

At Step SW18, the value $D_3$ is compared with the maximum drill diameter, and if the value $D_3$ is less than the maximum drill diameter, the diameter of the high-speed steel drill is set at the value $D_3$ (Step SW19). For flattening the hole bottom face after having bored the same, the roughing end mill diameter is set at ($D_3$−end mill allowance) (Step SW20) so that the rough machining on the blank shape rear end face is conducted only by a drill and an end mill to minimize the number of steps. Otherwise, the high-speed steel drill diameter is set as the maximum drill diameter (Step SW21), and roughing end mill diameter at (maximum drill diameter−end mill allowance) (Step SW22) so that machining is conducted with a drill having the largest possible diameter and with a roughing end mill having a diameter which could minimize the distance the cutter should travel. At Step SW23, the width/length ratio in the drill machining scope is compared with the value $\delta$, and if the ratio is less than the value $\delta$, it is judged that the machining scope is too shallow to require the center machining, and the process advances to Step SW27. Otherwise, it is judged that the center machining is necessary, and the process advances to Step SW24. At the Step SW24, the machining scope is determined based on the shape data of the center machining drill stored in the parameter memory 7 (FIG. 29B), and the types and scope of the machining are stored in the temporary memory 4. At Step SW25, the machining scope is determined based on the tool diameter determined at Step SW19 or SW21 (FIG. 29B), and the types and scope of the machining are stored in the temporary memory 4. At Step SW26, the machining scope is determined based on the tool diameter determined at Step SW20 or SW22 (FIG. 29B), and the types and scope of the machining are stored in the temporary memory 4, and the process returns to a step immediately after Step S341 of FIG. 12C, or Step S315 of FIG. 12A.

At Step SW27, the machining scope is determined based on the tool diameter determined at Step SW19 or SW21 (FIG. 30B), and the types and scope of the machining are stored in the temporary memory 4. At Step SW28, the machining scope is determined based on the tool diameter determined at Step SW20 or SW22 (FIG. 30B), and the types and scope of the machining are stored in the temporary memory 4. The process returns to a step immediately after Step S341 of FIG. 12C, or Step S315 of FIG. 12A.

At Step SW11, the value $D_3$ is compared with the maximum drill diameter, and if the value $D_3$ is less than the diameter, the carbide drill diameter $D_3$, and the roughing and mill diameter at ($D_3$−end mill allowance) (Step SW13) so that the rough machining on the blank shape rear end face could be conducted only with a drill and an end mill to minimize the number of steps. Otherwise, the carbide drill diameter is set at the maximum drill diameter (Step SW14), and the roughing end mill diameter at (maximum end mill diameter−end mill allowance) (Step SW15) so that the machining is conducted with a drill having the largest possible diameter and with a roughing end mill having a diameter which could minimize the distance of cutter feed. At Step SW16, the machining scope is determined based on the tool diameter determined at Step SW12 or SW14 (FIG. 31B) and the types and scope of the machining are stored in the temporary memory 4. At Step SW17, the machining scope is determined based on the tool diameter determined at Step SW13 or SW15 (FIG. 31B), and the types and scope of the machining are stored in the temporary memory 4. The process returns to a step immediately after Step S341 of FIG. 12C, or Step S315 of FIG. 12A.

Figure 11:
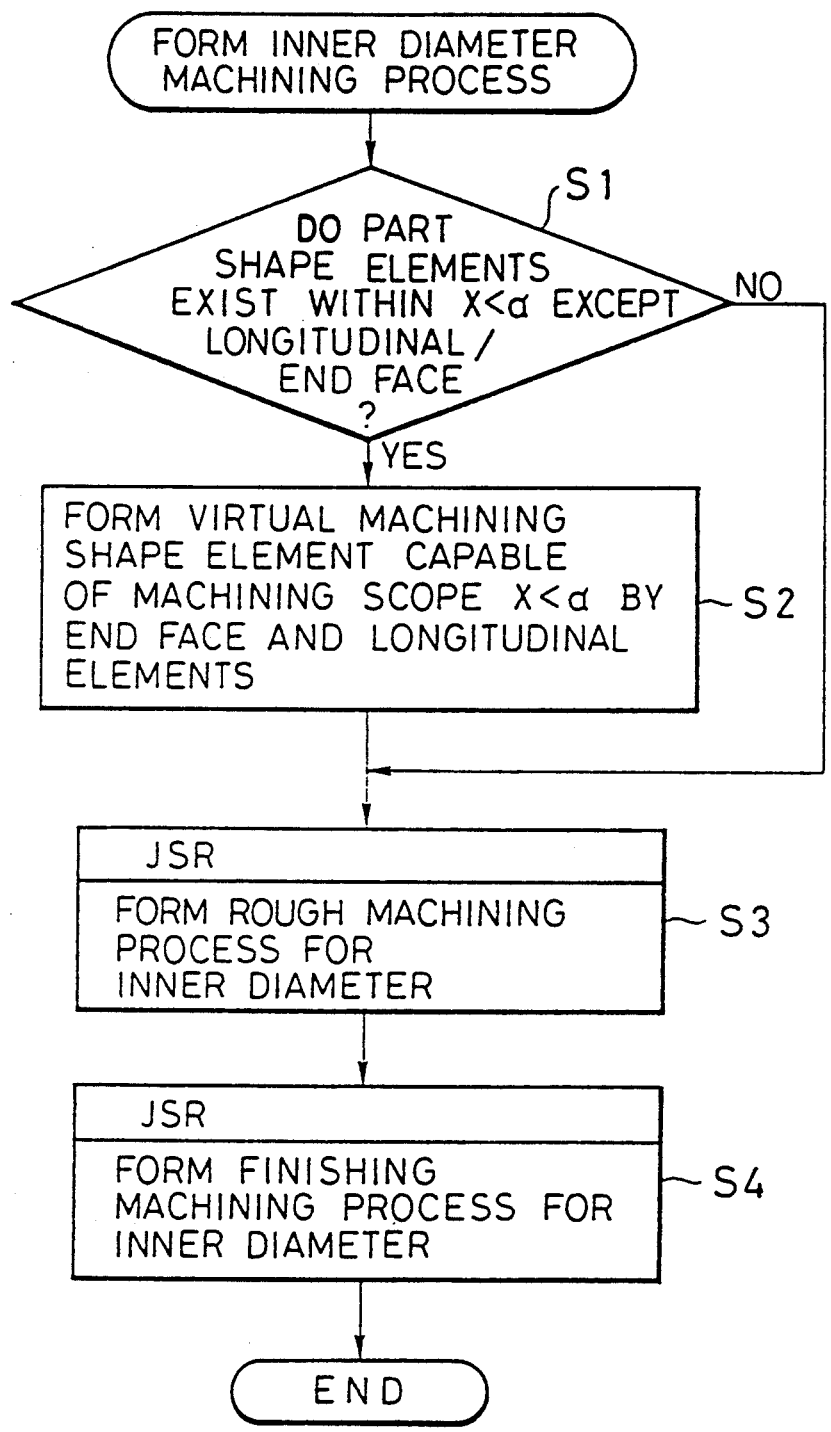
FIGS. 11, 12A-1, 12A-2, 12B, 12C, 12D, 12E, 13A, 13B, 13C, 14A, 14B, 14C, 15A-1, 15A-2, 15B-1, 15B-2 are flowcharts of the present invention.
Figures 1, 15A:
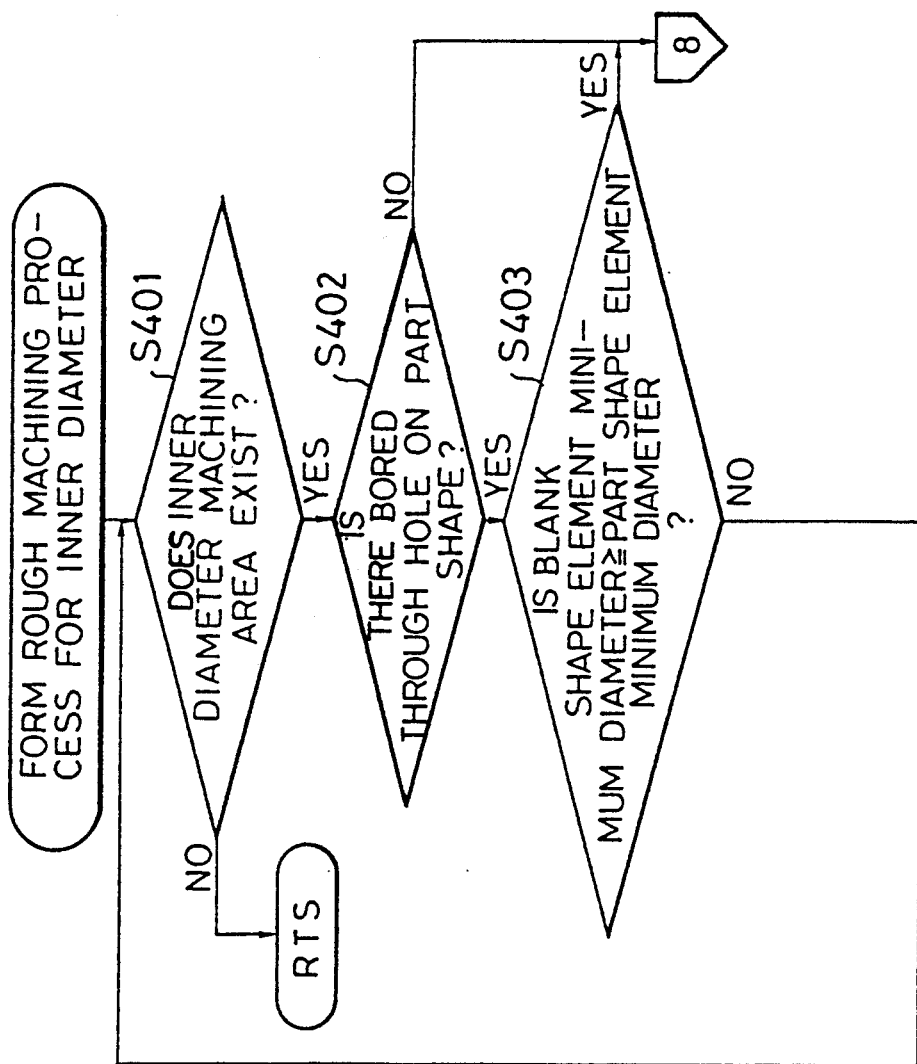
Figures 2, 15A:
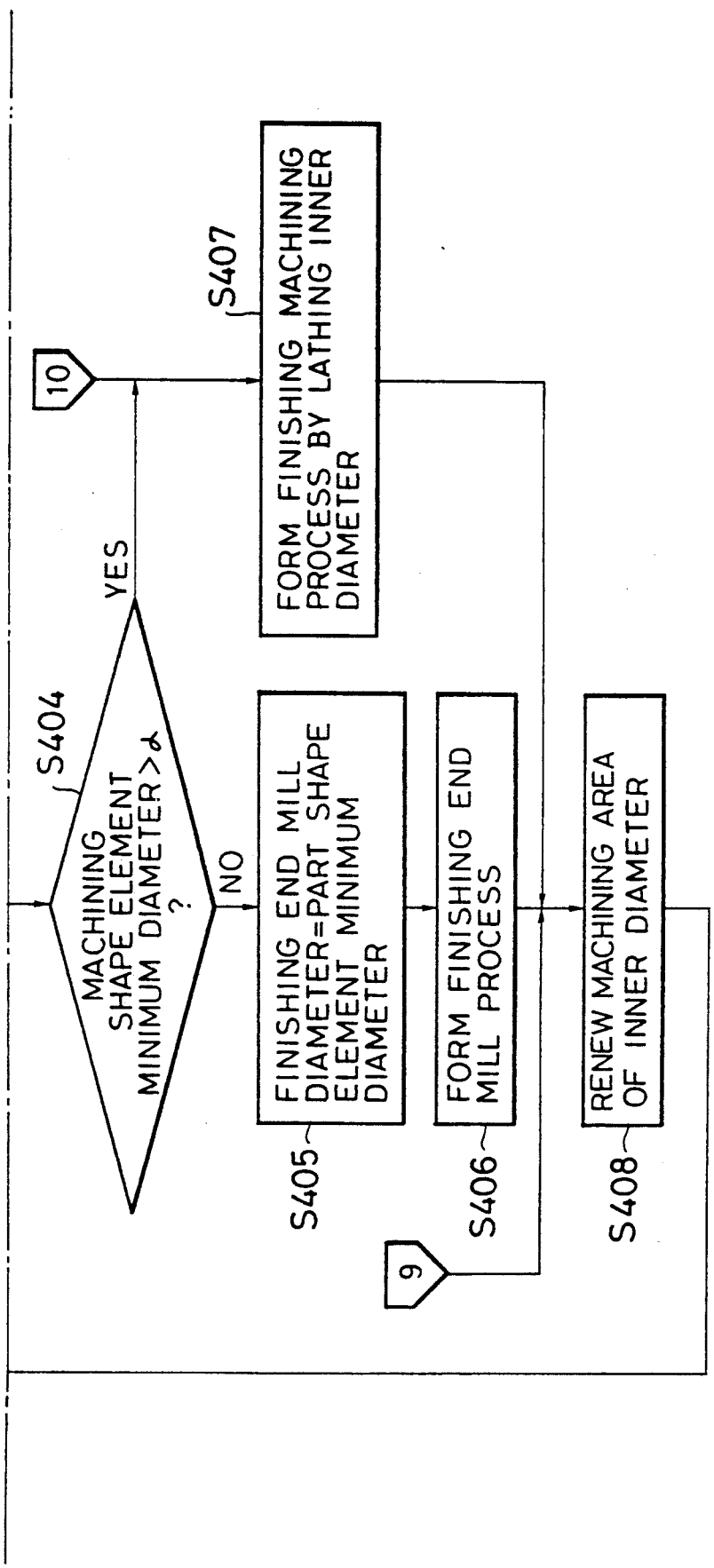
Figures 2, 15B:
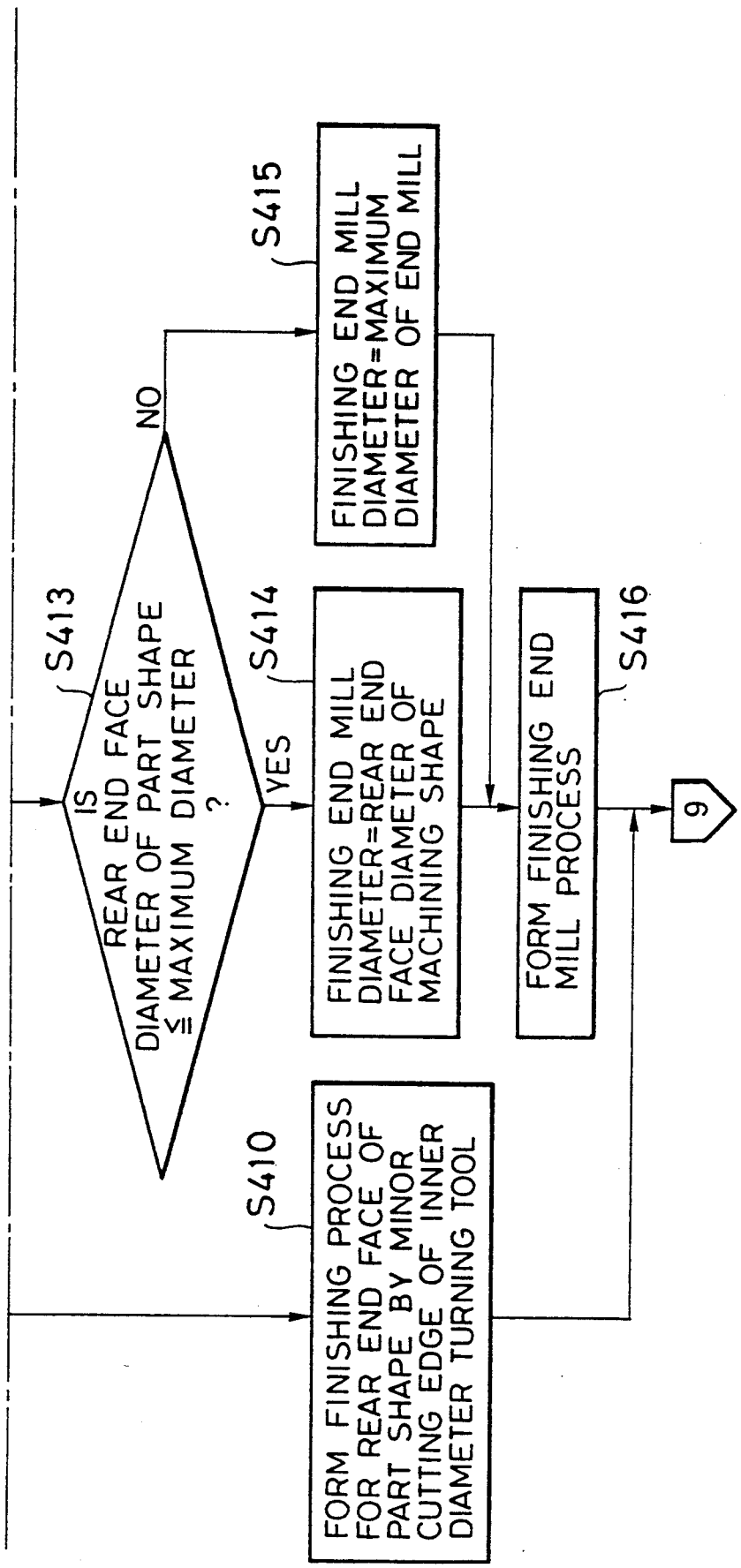

At Step S4 of FIG. 11, the process jumps to a subroutine shown in FIGS. 15A and 15B in order to form steps of inner diameter finish machining.

Figure 32:
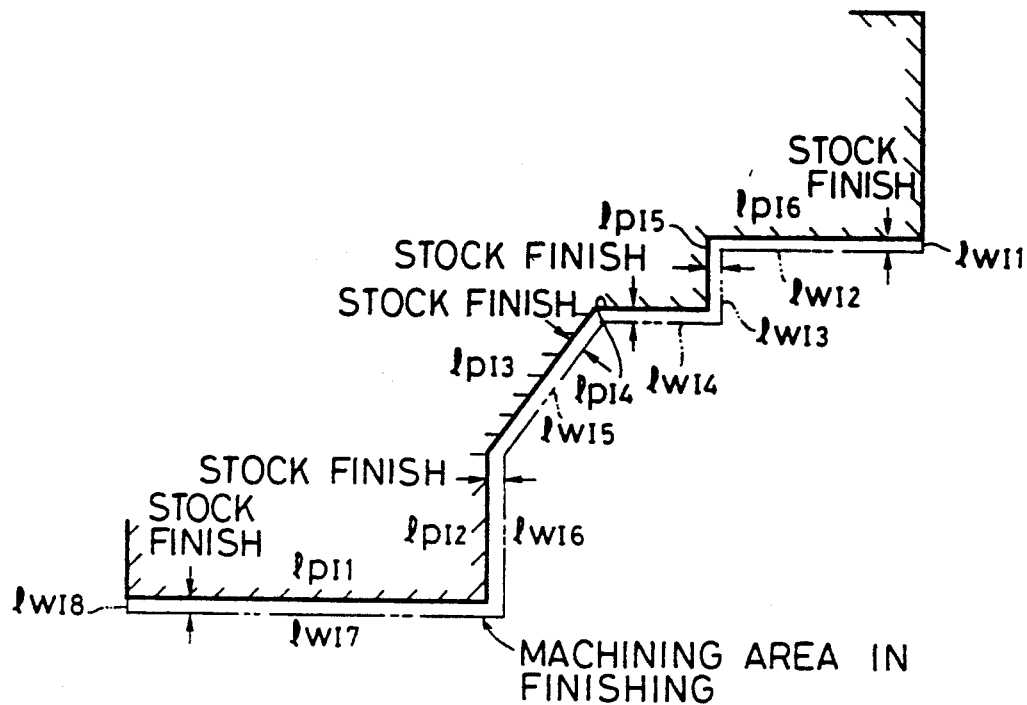
FIG. 32 shows an example of inner diameter machining area at finishing.

At Step S401, it is judged whether or not an inner diameter machining area exists, and if not, the process returns to the step immediately after Step S4. In other words, generating of inner machining steps is completed. However, if such area does exist, the process advances to Step S402. A machining area in the finish machining means an area defined by the final machining shape and the blank shape which is given as the final machining shape plus a finish stock. Therefore, the machining shape means the final machining shape as shown in FIG. 32.

Figures 33A, 33B, 33C:
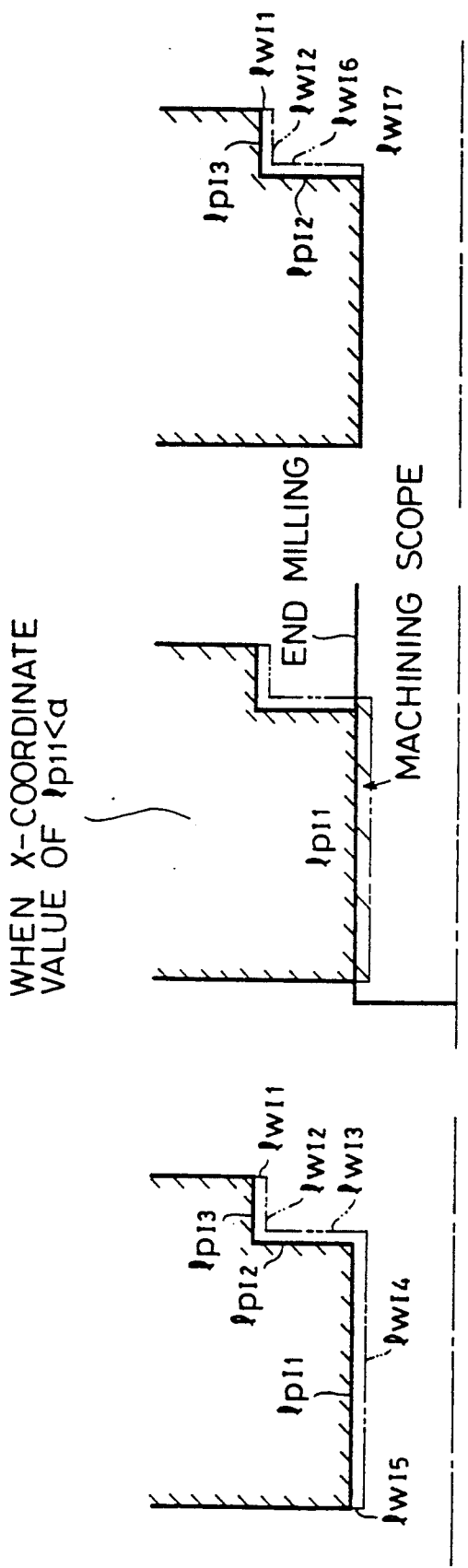
FIGS. 33A-33C show examples of determining the scope of machining and renewal of inner diameter machining area at finishing by a boring tool.

At Steps S402 and S403, it is judged whether or not a through hole exists in the machining shape, and the minimum diameter of the blank shape element is compared with that of the machining shape element, the elements forming the machining area. If the through hole exists in the machining shape and the minimum diameter of the blank shape element is smaller than that of the machining shape element, it is judged that the machining area exists in the through hole of the machining shape which needs finishing, and the process advances to Step S404. Otherwise, it is judged that the machining area is the one characteristic to machining of an inner diameter with a rear end face, and the process advances to Step S409 of FIG. 15B. At Step S404, the minimum diameter of the machining shape element is compared with the value $a$. If the diameter is larger than the value $a$, it is judged that the entire area could be finished by inner diameter turning, and the step of finishing with inner diameter turning is formed (Step S407), and the process advances to Step S408. If the minimum diameter of the machining shape element is less than the value $a$, it is judged that the inner diameter machining area is an area characteristic to the machining of the inner diameter with the through hole on the blank (as exemplified in FIG. 33A), and the process advances to Step S405 in order to finish the through hole portion of the machining shape with a finishing end mill. At Step S405, the finishing end mill diameter is set as the minimum diameter of the machining shape element. At Step S406, the machining scope is determined based on the tool diameter determined at Step S405, and the types and scope of the machining are stored in the temporary memory 4 (FIG. 33B).

Figure 34:
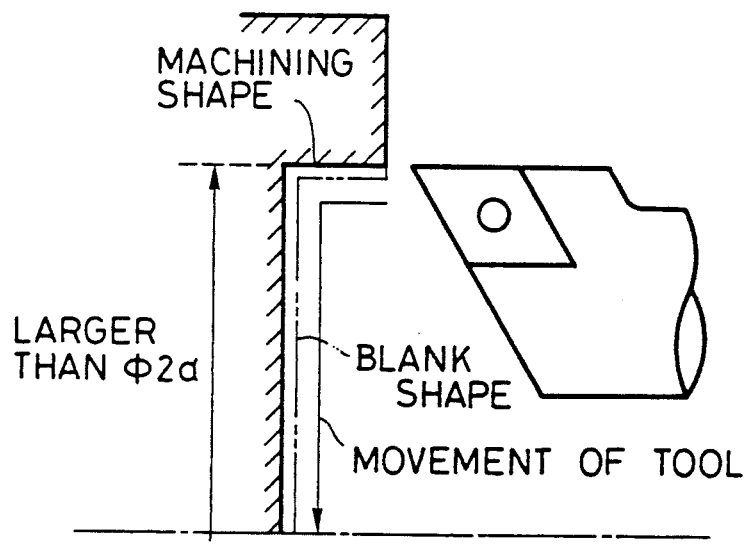
FIG. 34 shows examples of inner diameter machining area which allows machining at the rear end face of the machining shape by a minor cutting edge blade of the cutting tool.
Figure 36:
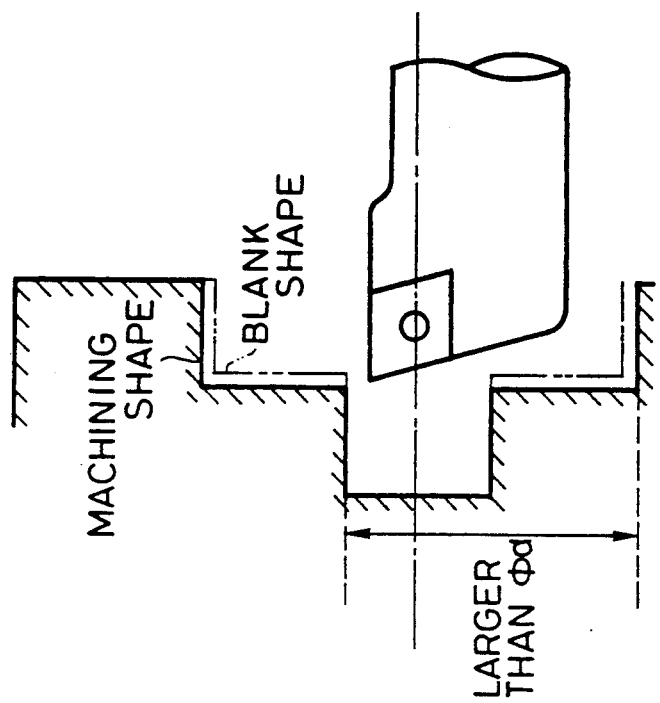
FIGS. 35 and 36 show examples of the inner machining area which are machinable by an inner diameter cutting tool.
Figure 35:
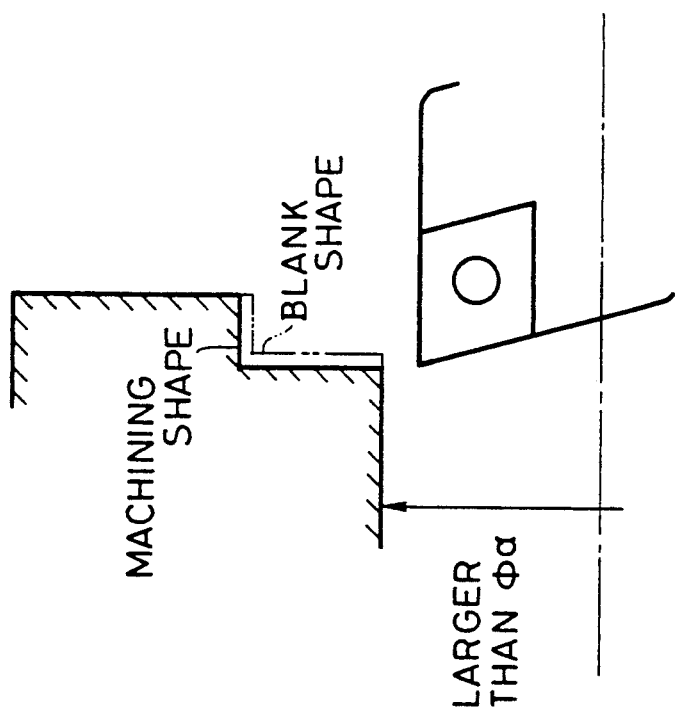

At step S408, the machining area is renewed based on the determined scope (FIG. 33C), and the process returns to Step S401. At Step S409, the rear end face diameter of the machining shape is compared with the value $2a$, and if the diameter is larger than the value $2a$, it is judged that the machining shape rear end face could be finished with a minor cutting edge of the inner diameter turning tool as shown in FIG. 34, and the process advances to Step S410. Otherwise, the process advances to Step S411. At Step S410, the machining shape rear end face is set as the scope of the machining with the minor cutting edge of the inner diameter turning tool, and the types and scope of the machining are stored in the temporary memory 4. The process than advances to Step S408 of FIG. 15A. At Steps S411 and S412, a comparison is made between the minimum diameter of the work shape element and the value $a$, and between the sum of the maximum value and the minimum value of the machining shape rear end face in the X direction and the value $2a$. If the minimum diameter of the blank shape element is larger than the value $a$, or if the mean value of the maximum and minimum values in the X direction is larger than the value $a$, it is judged that machining could be conducted by an inner diameter turning tool as shown in FIGS. 35 and 36, and the process goes to Step S407 of FIG. 15A. Otherwise, the process advances to Step S413 judging that an end mill is more suitable for finishing.

At Step S413, the rear end face diameter of the machining shape is compared with the maximum end mill diameter, and if the rear end face diameter is less than the maximum end mill diameter, the finishing end mill diameter is set as the rear end face diameter of the machining shape (Step S414). Otherwise, the finishing end mill diameter is set as the end mill maximum diameter so that the machining could be conducted with an end mill having the largest possible diameter and yet mountable on the machine (Step S415). At Step S416, the machining scope is determined based on the tool diameter determined at Step S414 or S415, and the type and scope of the machining are stored in the temporary memory 4. The process goes to Step S408 of FIG. 15A. Thus, an example of the machining step generating method for an inner diameter machining scope has been described.

After the above steps, the processor 1 forms numerical control information for the inner diameter machining based on the information on the types and scope of the machining which have been stored in the temporary memory 4 and on the machining conditions and tool types which are either extracted from the data registered in the parameter memory 7 in advance or automatically determined by the processor 1, and stores them in a numerical control information memory 8. An operator can conduct any desired machining using the numerical control information stored in the memory 8.

Figures 37A, 37B:
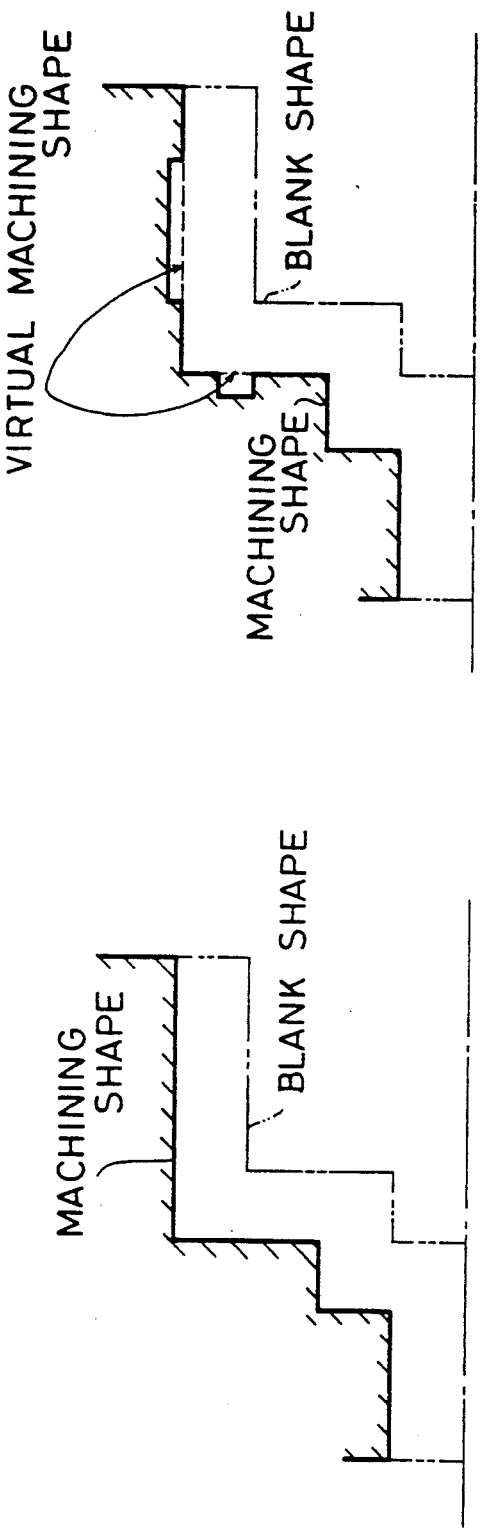
FIGS. 37A and 37B examples of lids by virtual machining shapes in correspondence to a recess on the machining shape.

In the embodiment, as shown in FIG. 37A, both in the machining shape and the blank shape in the inner diameter machining scope, X is monotonically increasing as Z increases. This is because, considering the fact that when a machining shape of a recessed form exists in a machining area characteristic to the inner diameter machining, such a recessed shape is generally machined by a grooving or an inner diameter turning, it is judged that not much problem would occur even if the steps are determined by closing the recessed portions with a virtual lid before generating the grooving steps or the inner diameter turning steps, as shown in FIG. 37B.

As stated in the foregoing, according to the present invention, simply by inputting the shapes of the blank and the machining on which the machining is to be conducted, it becomes possible to automatically extract a machining area characteristic to each machining method in the inner diameter machining, and to automatically determine the optimal machining method for the area. This can eliminate the necessary to review the machining methods before data input and thereby allows beginners without expertise and knowledge of complicated inner diameter machining to easily determine a method for the inner diameter machining.

It should be understood that many modifications and adaptations of the invention will become apparent to those skilled in the art and it is intended to encompass such obvious modifications and changes in the scope of the claims appended hereto.

What is claimed is:

1. A method for determining an inner diameter machining method in the numerical control information generating function which forms information for numerical control prior to machining, which comprises the steps of:

inputting a blank shape and machining shape on which the machining is to be conducted;

determining a machining area based on the inputted shapes, identifying areas for an inner diameter machining within said machining area, and extracting characteristic machining areas to various machining methods in the inner diameter machining within said inner diameter machining area based on shape element data thereof so as to automatically determine machining needed for said characteristic machining areas;

wherein when machining shape elements comprising elements other than longitudinal and end face elements exist in said machining are characteristic to the inner diameter machining, for those machining shape elements that have diameter coordinates smaller than preset criteria, a virtual machining shape elements is established by connecting a longitudinal element extended from a point having at the maximum diameter coordinates in the end face direction and not exceeding the criteria for the end face part shape elements within said criteria and a longitudinal machining element having the smaller diameter coordinates among those elements having the minimum diameter coordinates in said machining shape, with an end face element extended form a point having the diameter identical to said criteria on said machining shape as long as to the intersection of said longitudinal element and the end face element, so as to enable machining in the maximum scope possible.

2. A method for determining an inner diameter machining method in a numerical control information generating function which forms information for numerical control prior to machining, which comprises the steps of:

inputting a blank shape and a machining shape on which the machining is to be conducted;

determining a machining area based on at least one area defined by blank shape elements and machining shape elements, said machining area being that area which remains when a closed loop area defined by shape elements constituting the machining shape is removed from the closed loop area defined by shape elements constituting the bank shape;

identifying an area for an inner diameter machining within said machining area, said area being determined to be a machining area defined by a line segment connecting a point having minimum diameter coordinates in a direction of an end face among points having maximum coordinates in a longitudinal direction of said machining shape with a center line in a direction of said end face, a line segment extending from the point having minimum diameter coordinates in said end face direction among the points having minimum coordinates in the longitudinal direction of said machining shape to a point having the coordinates in the longitudinal direction which are identical to the minimum coordinates of said blank shape in the longitudinal direction, a line segment extending from an end point of the line segment in the longitudinal direction to the center line in the direction of said end face, said center line and said machining shape; and extracting as a characteristic machining area to the inner diameter machining with an unprocessed through hole wherein the minimum diameter coordinates in the end face direction of said machining shape element are not zero but the minimum diameter coordinates of the end face direction of the blank shape elements are zero within said inner diameter machining area based on shape element data thereof so as to automatically determine types and scope of machining for said characteristic machining areas.

3. A method for determining an inner diameter machining method in the numerical control information generating function as claimed in claim 2, wherein, when machining the areas characteristic to said inner diameter machining with an unprocessed through hole, machining by boring is judged suitable, and a machining scope is determined for boring in correspondence to the minimum diameter coordinates of said machining shape elements.

4. A method for determining an inner diameter machining method in the numerical control information generating function as claimed in claim 3, wherein the machining efficiency is enhanced by conducting the maximum boring by setting the boring tool diameter which determines the machining scope at a value, which is a minimum diameter of the machining shape element minus a predetermined value set with the consideration of deviation of the boring tool.

5. A method for determining an inner diameter machining method in the numerical control information generating function as claimed in claim 4, wherein when determining the scope of boring, if a drilling is included in the selected types of boring, and if the diameter of said drill is larger than the preset criteria, it is judged that a carbide drill may be used, and the machining scope is determined based on the carbide drill shape, but if the diameter is not larger than the criteria, the machining scope is determined based on the shape of a high-speed steel drill.

6. A method for determining an inner diameter machining method in the numerical control information generating function as claimed in claim 4, wherein only when the conditions that the width of the machining area on the center line in the longitudinal direction is larger than the preset criteria and the width of said machining area in the longitudinal direction within the scope of the drill diameter determined is larger than preset criteria are met simultaneously, it is judged that a carbide drill may be used, and the machining scope is determined based on the carbide drill shape, but if neither of the conditions is met, the machining scope is determined based on the shape of a high-speed steel drill.

7. A method for determining an inner diameter machining method in the numerical control information generating function as claimed in claim 3, for machining with a boring tool having a diameter mountable on the machine by setting the diameter of the boring tool which determines the machining scope at a value which is the smaller of the largest tolerable diameter which is predetermined and a value obtained by taking a minimum diameter of the machining shape element and subtracting a predetermined value set with due consideration of a deviation of the boring tool.

8. A method for determining an inner diameter machining method in the numerical control information generating functions as claimed in claim 7, wherein when determining the scope of boring, if drilling is included in the selected types of boring, and if the quotient obtained by dividing the width of the characteristic machining area in the longitudinal direction within the scope of said drill diameter is smaller than the preset criteria, it is judged that a carbide drill may be used and the machining scope is determined based on the shape of the carbide drill, but if it is not smaller than the criteria, the machining scope is determined based on the diameter of a high-speed steel drill.

9. A method for determining an inner diameter machining method in the numerical control information generating function as claimed in claim 3, wherein when machining a characteristic area to the inner diameter machining with the unprocessed through hole, a high-speed steel drill shape having the determined boring tool diameter is assumed, and when a tip end point of said drill shape facing the machining direction is aligned with the point on the center line which gives the maximum value in the length of said area, if the outer peripheral corner of said high-speed steel drill does not interfere with said machining area, the machining area is judged suitable for drilling, and center machining and drilling are selected as the types of machining, but if it does interfere with the machining area, the machining area is judged unsuitable for drilling, and roughing end milling is selected.

10. A method for determining an inner diameter machining method in the numerical control information generating function as claimed in claim 9, wherein when rough machining a characteristic area to the inner diameter machining with rear end face or with an unprocessed through hole, if centering and drilling are included in the types of boring, and if the quotient obtained by dividing the width of the determined scope of drilling in the longitudinal direction with said drill diameter is smaller than the preset criteria, or if the machining scope is determined based on the shape of a carbide drill, then it is judged that there will not be much deviation of the drill in drilling, and the step of centering is omitted, but if the value is not smaller than the preset criteria and if the machining scope is determined based on the shape of the high-speed steel drill, it is judged that the deviation of the drill would be large in drilling without centering, and the step of centering is not omitted from the types of machining.

11. A method for determining an inner diameter machining method in a numerical control information generating function which forms information for numerical control prior to machining, which comprises the steps of:

inputting a blank shape and a machining shape on which the machining is to be conducted;

determining a machining area based on at least one area defined by blank shape elements and machining shape elements, said machining area being that area which remains when a closed loop area defined by shape elements constituting the machining shape is removed from the closed loop area defined by shape elements constituting the blank shape;

identifying an area for an inner diameter machining within said machining area, said area being determined to be a machining area defined by a line segment connecting a point having minimum diameter coordinates in a direction of an end face among points having maximum coordinates in a longitudinal direction of said machining shape with a center line in a direction of said end face, a line segment extending from the point having the minimum diameter coordinates in said end face direction among the points having the minimum coordinates in the longitudinal direction of said machining shape to a point having the coordinates in the longitudinal direction which are identical to the minimum coordinates of said blank shape in the longitudinal direction, a line segment extending from an end point of the line segment in the longitudinal direction to the center line in the direction of said end face, said center line and said machining shape; and extracting as a characteristic machining area to the inner diameter machining with a through hole in the work wherein the minimum diameter coordinates of both the machining shape elements and the blank shape elements in an end face direction are not zero, and wherein the minimum diameter coordinates of said blank shape elements in the end face direction are smaller than the minimum diameter coordinates of said machining shape elements in the end face direction, and wherein the minimum diameter coordinates in the end face direction of the blank shape elements constituting said inner diameter machining area are smaller than predetermined criteria within said inner diameter machining area based on shape element data thereof so as to automatically determine types and scope of machining for said characteristic machining areas.

12. A method for determining an inner diameter machining method in the numerical control information generating function as claimed in claim 11, wherein when rough machining a characteristic area to the inner diameter machining with an unprocessed through hole in the work, a drilling step is not generated as type of machining in order not to be influenced by the deviation in the through hole on said work.

13. A method for determining an inner diameter machining method in the numerical control information generating function as claimed in claim 12, wherein in a characteristic area to the inner diameter machining with an unprocessed through hole in the work, if the minimum diameter of the machining shape or the minimum diameter coordinate of said machining shape elements is smaller than the preset criteria, the portion of the through hole in the machining shape is judged suitable for boring alone, and the scope of boring is determined based on the minimum diameter of said machining shape but, if the minimum diameter is larger than said criteria, the portion of the through hole is judged suitable for boring as well as the inner diameter turning, and the scope of boring is determined based on the minimum diameter of said machining shape added to a stock for the inner diameter turning machining.

14. A method for determining an inner diameter machining method in the numerical control information generating function as claimed in claim 12, wherein when determining the scope of machining on the basis of the minimum diameter in the machining shape with due consideration of stock for inner diameter turning, the diameter of the roughing end mill which determines the machining scope is set as the minimum diameter of the machining shape—preset value determined with due consideration of the deviation of the end mill so as to limit the scope of inner diameter turning to the minimum for high machining efficiency.

15. A method for determining an inner diameter machining method in the numerical control information generating function as claimed in claim 14, wherein the drill diameter for determining the machining scope is set at the smaller of the preset tolerable maximum diameter of the end mill or the minimum diameter of the machining shape—a value preset with due consideration of the deviation of the end mill so as to enable machining with an end mill having a diameter which is mountable on the machine, so as to enable machining of the portion of the through hole in said machining shape by a boring machining alone.

16. A method for determining an inner diameter machining method in the numerical control information generating function as claimed in claim 11, wherein in a characteristic area to the inner diameter machining with an unprocessed through hole in the work, if the minimum diameter of the machining shape or the minimum diameter coordinate of said machining shape elements is smaller than the preset criteria, the portion of the through hole in the machining shape is judged suitable for boring alone, and the scope of boring is determined based on the minimum diameter of said machining shape but, if the minimum diameter is larger than said criteria, the portion of the through hole is judged suitable for boring as well as the inner diameter turning, and the scope of boring is determined based on the minimum diameter of said machining shape added with a stock for the inner diameter turning machining.

17. A method for determining an inner diameter machining method in the numerical control information generating function as claimed in claim 16, wherein when determining the scope of boring on the basis of the minimum diameter of said machining shape, the roughing end mill diameter and the finishing end mill diameter in the post machining are so determined that the finishing end mill diameter=minimum diameter of the machining shape, and the roughing end mill diameter=the diameter of the finishing end mill—a value preset with due consideration of the finish stock so as to enable machining of the portion of the through hole in said machining shape by a boring machining alone.

18. A method for determining an inner diameter machining method in a numerical control information generating function which forms information for numerical control prior to machining, which comprises the steps of:

inputting a blank shape and a machining shape on which the machining is to be conducted;

determining a machining area based on at least one are defined by blank shape elements and machining shape elements, said machining area being that area which remains when a closed loop area defined by shape elements constituting the machining shape is removed from the closed loop area defined by shape elements constituting the blank shape;

identifying an area for an inner diameter machining within said machining area, said area being determined to be machining are defined by a line segment connecting a point having minimum diameter coordinates in a direction of an end face among points having maximum coordinates in a longitudinal direction of said machining shape with a center line in a direction of said end face, a line segment extending from the point having the minimum diameter coordinates in said end face direction among the points having the minimum coordinates in the longitudinal direction of having the minimum coordinates in the longitudinal direction of said machining shape to a point having the coordinates in the longitudinal direction which are identical to the minimum coordinates of said blank shape in the longitudinal direction, a line segment extending from an end point of the line segment in the longitudinal direction to the center line in the direction of said end face, said center line and said machining shape; and extracting as a machining area characteristic to the inner diameter machining with a rear end face wherein a machining area wherein the minimum diameter coordinates of the machining shape elements in the end face direction are zero or the minimum diameter coordinates of the blank shape elements in the end face direction are larger than the minimum diameter coordinates of the machining shape elements in the end face direction, and wherein the minimum diameter coordinates of the blank shape constituting said inner diameter machining areas are smaller than predetermined criteria within said inner diameter machining area based on shape element data thereof so as to automatically determine types and scope of machining for said characteristic machining areas.

19. A method for determining an inner diameter machining method in the numerical control information generating function as claimed in claim 18, wherein when machining a characteristic area to the inner diameter machining with said rear end face, if the quotient obtained by dividing the value of the width of said characteristic area in the end face direction with the value of the width in the length is larger than said predetermined criteria, it is judged that said machining area is relatively shallow, and outer diameter end face machining is selected as the machining type, and a scope which is machinable with said outer diameter end face machining is selected out of said areas as the machining scope.

20. A method for determining an inner diameter machining method in the numerical control information generating function as claimed in claim 18, wherein when machining a characteristic area to the inner diameter machining with said rear end face, if the value of the width of the characteristic area in length is smaller than said predetermined criteria, said machining area is judged shallow and outer diameter end face machining is selected as the machine type and the scope machinable with said outer diameter end face is selected as the machining scope.

21. A method for determining an inner diameter machining method in the numerical control information generating function as claimed in claim 18, wherein when machining a characteristic area to the inner diameter machining with said rear end face, when a straight line is extended at a prescribed angle from a point on said machining shape elements having the diameter coordinates identical to said predetermined criteria, if the straight line does not cross said part shape elements in the scope having diameter coordinates of the end face direction larger than said predetermined criteria, the part having diameter smaller than said predetermined criteria is judged suitable for machining with an outer diameter turning tool as the machining type, and the scope machinable with said outer diameter end face machining is selected as the machining scope.

22. A method for determining an inner diameter machining method in the numerical control information generating function as claimed in claim 18, wherein when plural conditions exist, the conditions being, when machining a characteristic area to the inner diameter machining with said rear end face a condition that the quotient obtained by dividing the value of the width of said characteristic area in the end face direction with the value of the width in the length is larger than said predetermined criteria, a condition that the value of the width of the characteristic area in length is smaller than predetermined criteria and a condition that a straight line does not cross said machining shape elements in the scope having diameter coordinates of the end face direction larger than said predetermined criteria when the straight line is extended at a prescribed angle from a point on said machining shape elements having the diameter coordinates identical to the predetermined criteria, the outer diameter end face machining is judged suitable as the machining type, and the scope machinable with said outer diameter end face machining is selected as the machining scope.

23. A method for determining an inner diameter machining method in the numerical control information generating function as claimed in claim 18, wherein when any one of the conditions met the conditions being, when machining a characteristic area to the inner diameter machining with said rear end face a condition that the quotient obtained by dividing the value of the width of said characteristic area in the end face direction with the value of the width in the length is larger than said predetermined criteria, a condition that the value of the width of the characteristic area in length is smaller than said predetermined criteria and a condition that a straight line does not cross said machining shape elements in the scope having diameter coordinates of the endface direction larger than said predetermined criteria when the straight line is extended at a prescribed angle from a point on said machining shape elements having the diameter coordinates identical to said predetermined criteria, the number of machining steps are compared between the case where the types and scope of steps subsequent machining are determined on the premise that said outer diameter end face machining is to be conducted, and the case where they are determined on the premise that the outer diameter end face machining is not conducted, and whichever case has fewer machining steps is selected.

24. A method for determining an inner diameter machining method in the numerical control information generating function as claimed in claim 18, wherein when machining a characteristic area to said inner diameter machining with area end face, those end face elements in the machining shape constituting such characteristic machining area that have the minimum coordinates in the longitudinal direction are judged suitable for boring, and the machining scope for boring is determined based on the rear end face diameter of the machining shape which is the maximum diameter coordinate of said part shape end face elements in end face direction.

25. A method for determining an inner diameter machining method in the numerical control information generating function as claimed in claim 24, wherein when determining the machining scope for said boring, if drilling is selected as the machining type, a roughing end milling for flattening the hole bottom is determined as the subsequent step.

26. A method for determining an inner diameter machining method in the numerical control information generating function as claimed in claim 24, wherein when the machining scope for boring is determined based on the rear end face diameter of the part shape, the diameters of the drill, the roughing end mill, and the finishing end mill in the subsequent process which determine the machining scope are set as the finishing end mill diameter=rear end face diameter of the machining shape, the roughing end mill diameter=finishing end mill diameter—a value predetermined with the consideration of the finish stock, and the drill diameter=the rear end face diameter of the machining shape—a value predetermined with due consideration of finish stock, so that the rear end face portion of the machining shape element may be machined only by boring.

27. A method for determining an inner diameter machining method in the numerical control information generating function as claimed in claim 26, wherein when the drill diameter selected to determine the machining scope exceeds a preset tolerable maximum diameter of the drill, the diameters of the drill, the roughing end mill and the finishing end mill are corrected as the drill diameter=a preset tolerable maximum diameter, the roughing end mill diameter=the drill diameter—a value preset with due consideration of the deviation of the end mill, and the finishing end mill diameter=the roughing end mill diameter+a value preset with due consideration of finish stock, so that the machining becomes possible with boring tool of a size mountable on the machine.

28. A method for determining an inner diameter machining method in numerical control information generating functions as claimed in claim 27, wherein when determining the scope of boring, if drilling is included in the selected types of boring, and if the quotient obtained by dividing the width of the characteristic machining area in the longitudinal direction within the scope of said drill diameter is smaller than the preset criteria, it is judged that a carbide drill may be used and the machining scope is determined based on the shape of the carbide drill, but if it is not smaller than the criteria, the machining scope is determined based on the diameter of a high-speed steel drill.

29. A method for determining an inner diameter machining method in the numerical control information generating function as claimed in claim 24, wherein when rough machining a characteristic area to the inner diameter machining with rear end face, if the width of the machining area on the center line in the longitudinal direction is larger than the preset criteria, it is judged the work is thick enough to require drilling, and types of center machining, drilling and roughing end milling are selected as the machining types, and if the width is smaller than said criteria, it is judged the work is not thick enough for drilling, and roughing end milling alone is selected as the machining type.

30. A method for determining an inner diameter machining method in the numerical control information generating function as claimed in claim 29, wherein when machining a characteristic area to the inner diameter machining with rear end face, if the scope of boring is determined based on the rear end face diameter of said machining shape, and if the rough end milling alone is selected as the type of boring in the rough machining, the roughing end mill diameter should be corrected as the rear end face diameter of the machining shape—a value preset with due consideration of finish stock or the diameters determining the machining scope, and the finishing end mill diameter as (the rear end face diameter of the machining shape) so that the rear end face portion of machining shape elements may be machined only with said roughing end mill and finishing end mill.

31. A method for determining an inner diameter machining method in the numerical control information generating function as claimed in claim 29, wherein in that when machining an area characteristic to the inner diameter machining with rear end face, if the scope of boring is determined based on the rear end face diameter of said blank shape, and if the roughing end milling alone is selected as the type of boring in the rough machining, the roughing end mill diameter should be corrected as the rear end face diameter of the blank shape—a value preset with due consideration of the deviation of the drill, and the finishing end mill diameter as (the roughing end mill diameter+a value preset with due consideration of the finish stock or the diameters determining the machining scope so that the scope of boring is limited to be on the rear end face portion of said blank shape elements for higher machining efficiency.

32. A method for determining an inner diameter machining method in the numerical control information generating function as claimed in claim 24, wherein when rough machining a characteristic area to the inner diameter machining with rear end face, if the width of said machining area in the longitudinal direction within the scope of the drill diameter determined is larger than preset criteria, it is judged that the work is thick enough to require drilling, and the centering, drilling and roughing end milling are selected as the machining types, and if the width thereof is smaller than said criteria, it is judged that the work is not thick enough for drilling, and roughing end milling alone is selected as the machining type.

33. A method for determining an inner diameter machining method in the numerical control information generating function as claimed in claim 32, wherein as the criterion for judging whether or not the work has a thickness enough for drilling, it is judged whether or not the outer peripheral corner of the drill is insertable into said work, and the length of the drill from the center to the outer peripheral corner in the longitudinal direction is measured to be used as the criterion.

34. A method for determining an inner diameter machining method in the numerical control information generating function as claimed in claim 24, wherein when rough machining a characteristic area to the inner diameter machining with rear end face, if the shape of a high-speed steel drill with the determined diameter is assumed and if the outer peripheral corner of the high-speed steel drill does not interfere with said machining area when the tip end point of said shape facing the machining direction is aligned with the point which gives the maximum value of the area in the longitudinal direction along the center line, the area judged suitable for drilling, and centering, drilling, and roughing and milling are selected as the machining types, and if it does interfere, the area is judged not suitable for drilling, and roughing end milling is selected.

35. A method for determining an inner diameter machining method in the numerical control information generating function as claimed in claim 34, wherein when machining a characteristic area to the inner diameter machining with rear end face, if the scope of boring is determined based on the rear end face diameter of said machining shape, and if the rough end milling alone is selected as the type of boring in the rough machining, the roughing end mill diameter should be corrected as the rear end face diameter of the machining shape—a value preset with due consideration of finish stock or the diameters determining the machining scope, and the finishing end mill diameter as the rear end face diameter of the machining shape so that the rear end face portion of machining shape elements may be machined only with said roughing end mill and finishing end mill.

36. A method for determining an inner diameter machining method in the numerical control information generating function as claimed in claim 34, wherein in that when machining an area characteristic to the inner diameter machining with rear end face, if the scope of boring is determined based on the rear end face diameter of said blank shape, and if the roughing end milling alone is selected as the type of boring in the rough machining, the roughing end mill diameter should be corrected as the rear end face diameter of the blank shape—a value preset with due consideration of the deviation of the drill, and the finishing end mill diameter as the roughing end mill diameter+a value preset with due consideration of the finish stock or the diameters determining the machining scope so that the scope of boring is limited to be on the rear end face portion of said blank shape elements for higher machining efficiency.

37. A method for determining an inner diameter machining method in the numerical control information generating function as claimed in claim 24, wherein when machining a characteristic area to the inner diameter machining with rear end face, if the scope of boring is determined based on the rear end face diameter of said machining shape, and if the rough end milling alone is selected as the type of boring in the rough machining, the roughing end mill diameter should be corrected as the rear end face diameter of the machining shape—a value preset with due consideration of finish stock or the diameters determining the machining scope, and the finishing end mill diameter as the rear end face diameter of the machining shape so that the rear end face portion of machining shape elements may be machined only with said roughing end mill and finishing end mill.

38. A method for determining an inner diameter machining method in the numerical control information generating function as claimed in claim 37, wherein the roughing end mill diameter is corrected as the smaller of blank shape the rear end face diameter—a value preset with due consideration of the deviation on the drill, (the rear end face diameter of the blank shape—a value preset with due consideration of the finish stock or preset end mill tolerable maximum diameter—a value preset with due consideration of the finish stock, and the finishing end mill diameter as the roughing end mill diameter+a value preset with due consideration of the finish stock or the diameters determining the machining scope, so as to enable machining with an end mill having a diameter which is mountable on the machine.

39. A method for determining an inner diameter machining method in the numerical control information generating function as claimed in claim 24, wherein in that when machining an area characteristic to the inner diameter machining with rear end face, if the scope of boring is determined based on the rear end face diameter of said blank shape, and if the roughing end milling alone is selected as the type of boring in the rough machining, the roughing end mill diameter should be corrected as the rear end face diameter of the blank shape—a value preset with due consideration of the deviation of the drill, and the finishing end mill diameter as the roughing end mill diameter+a value preset with due consideration of the finish stock or the diameters determining the machining scope so that the scope of boring is limited to be on the rear end face portion of said blank shape elements for higher machining efficiency.

40. A method for determining an inner diameter machining method in the numerical control information generating function as claimed in claim 18, wherein when machining a characteristic area to the inner diameter machining with rear end face, if there is only one end face element in the blank shape which constitutes said characteristic area or if the rear end face diameter of the blank shape which is smaller than the maximum diameter coordinates in the end face direction is smaller than the said predetermined criteria, it is judged suitable to machine the rear end face portion of said machining shape element as much as possible by boring, and the scope of boring is determined based on the maximum diameter coordinates of the machining shape element in the end face direction which are obtained when the rear end face of the machining shape is machined, and if the rear end face diameter of said blank shape is larger than said predetermined criteria, it is judged most time saving to machine by boring only the rear end face portion of said blank shape, and the scope of boring is determined based on said rear end face diameter of the blank shape.

41. A method for determining an inner diameter machining method in the numerical control information generating function as claimed in claim 40, wherein when determining the scope of boring based on said blank shape rear end face diameter, the diameters of the drill, the roughing end mill and the finishing end mill which determine the machining scope are set at the drill diameter=the rear end face diameter of the blank shape—a value predetermined with due consideration of deviation of the drill, the roughing end mill diameter=the drill diameter—a value predetermined with due consideration of deviation of the end mill, and the finishing end mill diameter=the roughing end mill diameter+a value predetermined with due consideration of finish stock, so that scope of boring is limited to the rear end face portion of said blank shape elements in order to enhance machining efficiency.

42. A method for determining an inner diameter machining method in the numerical control information generating function as claimed in claim 41, wherein when determining the scope of boring, if a drilling is included in the selected types of boring, and if the diameter of said drill is larger than the preset criteria, it is judged that a carbide drill may be used, and the machining scope is determined based on the carbide drill shape, but if the diameter is not larger than the criteria, the machining scope is determined based on the shape of a high-speed steel drill.

43. A method for determining an inner diameter machining method in the numerical control information generating function as claimed in claim 18, wherein when finishing a characteristic area to the inner diameter machining with rear end face, if the minimum diameter coordinates of the blank shape elements constituting said characteristic area is smaller than a value preset with due consideration of the minimum machining diameter of an inner diameter turning tool, and of the rear end face diameter of the machining shape is larger than preset criteria, it is judged that the inner diameter turning tool can be used to machine as far as to the center line if the minor cutting edge is used, and inner diameter turning is selected as the type of machining for the rear end portion in the machining shape, and if said machining shape rear end face diameter is smaller than said criteria, it is judged that said tool would reach the center line without interferring with the machining shape, and finishing end milling is selected as the type of machining for said rear end face portion.

44. A method for determining an inner diameter machining method in the numerical control information generating function as claimed in claim 18, wherein when finishing a characteristic area to the inner diameter machining with rear end face, if the sum of the maximum diameter coordinates and the minimum diameter coordinates of said machining shape rear end face is larger than preset criteria and if said minimum diameter coordinates are larger than another set of preset criteria, the area may be machined with said inner diameter turning tool, and inner diameter turning is selected as the type of machining for said rear end face portion in the machining shape.

* * * * *